US012812172B2

(12) United States Patent
Akhtar et al.

(10) Patent No.: US 12,812,172 B2
(45) Date of Patent: Nov. 24, 2026

(54) TRANSFORMS FOR CODING V-DMC BASE MESH ATTRIBUTES

(71) Applicant: QUALCOMM Incorporated, San Diego, CA (US)

(72) Inventors: Anique Akhtar, San Diego, CA (US); Geert Van der Auwera, San Diego, CA (US); Reetu Hooda, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/982,775

(22) Filed: Dec. 16, 2024

(65) Prior Publication Data

US 2025/0211786 A1 Jun. 26, 2025

Related U.S. Application Data

(60) Provisional application No. 63/614,139, filed on Dec. 22, 2023.

(51) Int. Cl.

*H04N 19/597* (2014.01)
*H04N 19/124* (2014.01)
*H04N 19/70* (2014.01)

(52) U.S. Cl.

CPC ......... *H04N 19/597* (2014.11); *H04N 19/124* (2014.11); *H04N 19/70* (2014.11)

(58) Field of Classification Search

CPC ..... H04N 19/597; H04N 19/124; H04N 19/70
See application file for complete search history.

(56) References Cited

U.S. PATENT DOCUMENTS

| | | | | |
|---|---|---|---|---|
| 2023/0290063 | A1* | 9/2023 | Mammou | G06T 9/001 |
| 2023/0412849 | A1* | 12/2023 | Huang | H04N 19/91 |
| 2025/0005803 | A1* | 1/2025 | Tokumo | G06T 9/001 |
| 2025/0069273 | A1* | 2/2025 | Zakharchenko | G06T 9/001 |
| 2025/0117965 | A1* | 4/2025 | Kim | G06T 9/001 |

OTHER PUBLICATIONS

Badino H., "Stixels: Free Space and Object Segmentation in Traffic Environments", Youtube, Retrieved date Apr. 24, 2024, pp. 1-2.

(Continued)

*Primary Examiner* — Richard T Torrente
(74) *Attorney, Agent, or Firm* — QUALCOMM Incorporated; Espartaco Diaz Hidalgo

(57) ABSTRACT

A device for decoding encoded dynamic mesh data is configured to determine, based on syntax signaled in a bitstream comprising the encoded dynamic mesh data, a transformed residual value for a vertex attribute of a dynamic mesh; determine a prediction value for the vertex attribute; determine a transformed reconstructed value for the vertex attribute based on the transformed residual value and the prediction value; inverse transforming the transformed reconstructed value for the vertex attribute to determine a reconstructed value for the vertex attribute; and output a reconstructed dynamic mesh sequence based on the reconstructed value for the vertex attribute.

27 Claims, 29 Drawing Sheets

(56) References Cited

OTHER PUBLICATIONS

Balle J., et al., "End-to-end Optimized Image Compression", arXiv:1611.01704v3 [cs.CV] Mar. 3, 2017, pp. 1-27.
Balle J., et al., "Nonlinear Transform Coding", arXiv:2007.03034v2 [cs.IT] Oct. 24, 2020, pp. 1-17.
Balle J., et al., "Variational Image Compression with a Scale Hyperprior", arXiv:1802.01436v2 [eess.IV] May 1, 2018, pp. 1-23.
Chen Y., et al., "A Efficient Predictive Wavelet Transform for LiDAR Point Cloud Attribute Compression", IEEE International Conference on Visual Communications and Image Processing (VCIP), Dec. 13-16, 2022, 5 Pages.
Cohen-Or D., et al., "Multi-way Geometry Encoding", Elsevier Science, Dec. 1, 2002, pp. 1-9.
Co-pending U.S. Appl. No. 18/428,957, inventor Rashed; Hazem Ahmed Mohamed Mohamed, filed Jan. 31, 2024.
Co-pending U.S. Appl. No. 18/882,516, inventor Hooda; Reetu, filed Sep. 11, 2024.
Cui S et al., "Motion Estimation and Compensation in the Redundant-wavelet Domain Using Triangle Meshes", Signal Processing. Image Communication, Elsevier Science Publishers, Amsterdam, NL, vol. 21, No. 7, Aug. 1, 2006, pp. 586-598, XP027934248, ISSN: 0923-5965.
Das S., et al., "Multi-Modal Curb Detection and Filtering", arXiv:2205.07096v1 [cs.CV] May 14, 2022, 5 Pages.
Guskov I et al., "Wavelet Compression of Parametrically Coherent Mesh Sequences", Eurographics/ACM SIGGRAPH Symposium on Computer Animation, Dec. 31, 2004, pp. 183-192, XP093256877.
Hou X., et al., "Learning based Image Transformation using Convolutional Neural Networks", Preparation of Papers for IEEE Transactions and Journals, vol. 4, 2016, pp. 1-13.
International Search Report and Written Opinion—PCT/US2024/060526—ISA/EPO—Mar. 20, 2025 14 Pages.
Isenburg M., et al., "Compressing Polygon Mesh Geometry with Parallelogram Prediction", IEEE Visualization, 2002, pp. 1-6.
Isenburg M., et al., "Compressing Texture Coordinates with Selective Linear Predictions", Proceedings Computer Graphics International, 2003, pp. 1-6.
Jain A.K., "A Fast Karhunen-Loeve Transform for a Class of Random Processes", IEEE Transactions on Communications, Sep. 1976, pp. 1023-1029.
Kim Y., et al., "CRN: Camera Radar Net for Accurate, Robust, Efficient 3D Perception", arXiv:2304.00670v2 [cs.CV] Aug. 17, 2023, 18 Pages.
Lopes H., et al., "Edgebreaker: A Simple Compression for Surfaces with Handles", Proceedings of the seventh ACM symposium on Solid modeling and applications, Jun. 17, 2002, pp. 289-296.
Lu G., et al., "DVC: An End-to-end Deep Video Compression Framework ", IEEE/CVF Conference on Computer Vision and Pattern Recognition (CVPR), 2019, pp. 11006-11015.
Mammou K., (APPLE) et al., "[V-CG] Apple's Dynamic Mesh Coding CFP Response", International Organisation for Standardisation Organisation Internationale DE Normalisation ISO/IEC JTC 1/SC 29/WG 7 Coding of Moving Pictures and Audio MPEG Meeting, Apr. 25, 2022-Apr. 29, 2022, Online, (Motion Picture Expert Group or ISO/IEC JTC1/SC29/WG11), No. M59281, Apr. 16, 2022, XP030301428, 21 Pages.
Mamou K et al., "The New MPEG-4/FAMC Standard for Animated 3D Mesh Compression", 3DTV Conference: The True Vision—Capture, Transmission and Display of 3D Video, 2008, IEEE, Piscataway, NJ, USA, May 28, 2008, pp. 97-100, XP031275220, ISBN: 978-1-4244-1760-5.
Manzini G., "An Analysis of the Burrows-Wheeler Transform", Journal of the Association for Computing Machinery, vol. 48, No. 3, May 2001, pp. 1-20.
OPENCV: "Operations on Arrays", Open Source Computer Vision, Retrieved Date Apr. 24, 2024, pp. 1-108.
Pei S-C., et al., "The Discrete Fractional Cosine and Sine Transforms", IEEE Transactions on Signal Processing, vol. 49, No. 6, Jun. 2001, pp. 1198-1207.
Rossignac J., et al., "3D Compression Made Simple: Edgebreaker on a Corner-Table", College of Computing and GVU Center, Jan. 2001, 7 Pages.
Rossignac J., "Triangle Meshes", 2006, pp. 1-7.
Thomas H., et al., "KPConv: Flexible and Deformable Convolution for Point Clouds", arXiv:1904.08889v2 [cs.CV] Aug. 19, 2019, 15 Pages.
Wold S., et al., "Principal Component Analysis", Chemometrics and Intelligent Laboratory Systems, vol. 2, Aug. 1987, pp. 37-52.
Zhang S., et al., "A 3D Haar Wavelet Transform for Point Cloud Attribute Compression Based on Local Surface Analysis", Picture Coding Symposium (PCS), Nov. 12-15, 2019, 5 Pages.

* cited by examiner b(i) -- Compressed Bitstream
A''(i) -- Decoded Attribute Map
M''(i) -- Decoded Mesh
m'(i) -- Reconstructed Quantized Base Mesh
m''(i) -- Decoded Base Mesh
d''(i) -- Decoded Displacements

TRANSFORMS FOR CODING V-DMC BASE MESH ATTRIBUTES

This application claims the benefit of U.S. Provisional Patent Application No. 63/614,139, filed 22 Dec. 2023, the entire contents of which is incorporated herein by reference.

TECHNICAL FIELD

This disclosure relates to video-based coding of dynamic meshes.

BACKGROUND

Meshes may be used to represent physical content of a 3-dimensional space. Meshes have utility in a wide variety of situations. For example, meshes may be used in the context of representing the physical content of an environment for purposes of positioning virtual objects in an extended reality, e.g., augmented reality (AR), virtual reality (VR), or mixed reality (MR), application. Mesh compression is a process for encoding and decoding meshes. Encoding meshes may reduce the amount of data required for storage and transmission of the meshes.

SUMMARY

This disclosure relates to encoding and decoding base mesh data. By introducing transforms and/or quantization into the encoding and corresponding inverse transforms and dequantization into the decoding of base mesh data, the techniques of this disclosure may improve the compression as judged, for example, by rate-distortion tradeoff achieved when coding base mesh data.

According to an example of this disclosure, a device for decoding encoded dynamic mesh data includes one or more memories; and one or more processors, implemented in circuitry and in communication with the one or more memories, configured to: determine, based on syntax signaled in a bitstream comprising the encoded dynamic mesh data, a transformed residual value for a vertex attribute of a dynamic mesh; determine a prediction value for the vertex attribute; determine a transformed reconstructed value for the vertex attribute based on the transformed residual value and the prediction value; inverse transforming the transformed reconstructed value for the vertex attribute to determine a reconstructed value for the vertex attribute; and output a reconstructed dynamic mesh sequence based on the reconstructed value for the vertex attribute.

According to an example of this disclosure, a method of decoding encoded dynamic mesh data includes determining, based on syntax signaled in a bitstream comprising the encoded dynamic mesh data, a transformed residual value for a vertex attribute of a dynamic mesh; determining a prediction value for the vertex attribute; determining a transformed reconstructed value for the vertex attribute based on the transformed residual value and the prediction value; inverse transforming the transformed reconstructed value for the vertex attribute to determine a reconstructed value for the vertex attribute; and outputting a reconstructed dynamic mesh sequence based on the reconstructed value for the vertex attribute.

According to an example of this disclosure, a device for encoding dynamic mesh data includes one or more memories and one or more processors, implemented in circuitry and in communication with the one or more memories, configured to: determine an actual value for a vertex attribute; determine a prediction value for the vertex attribute; transform the actual value to determine a transformed actual value for the vertex attribute; transform the prediction value to determine a transformed prediction value for the vertex attribute; determine a difference between the transformed actual value for the vertex attribute and the transformed prediction value for the vertex attribute to determine a residual value for the vertex attribute; and signal, in a bitstream comprising the encoded dynamic mesh data, one or more syntax elements indicating the residual value for the vertex attribute.

According to an example of this disclosure, a method of encoding dynamic mesh data includes determining an actual value for a vertex attribute; determining a prediction value for the vertex attribute; transforming the actual value to determine a transformed actual value for the vertex attribute; transforming the prediction value to determine a transformed prediction value for the vertex attribute; determining a difference between the transformed actual value for the vertex attribute and the transformed prediction value for the vertex attribute to determine a residual value for the vertex attribute; and signaling, in a bitstream comprising the encoded dynamic mesh data, one or more syntax elements indicating the residual value for the vertex attribute.

According to an example of this disclosure, a computer-readable storage medium stores instructions that when executed by one or more processors cause the one or more processors to determine, based on syntax signaled in a bitstream comprising encoded dynamic mesh data, a transformed residual value for a vertex attribute of a dynamic mesh; determine a prediction value for the vertex attribute; determine a transformed reconstructed value for the vertex attribute based on the transformed residual value and the prediction value; inverse transforming the transformed reconstructed value for the vertex attribute to determine a reconstructed value for the vertex attribute; and output a reconstructed dynamic mesh sequence based on the reconstructed value for the vertex attribute.

The details of one or more examples are set forth in the accompanying drawings and the description below. Other features, objects, and advantages will be apparent from the description, drawings, and claims.

DETAILED DESCRIPTION

This disclosure describes techniques related to video-based coding of dynamic meshes (V-DMC). A mesh generally refers to a representation of an object in a 3D space. The mesh can be defined by vertices and edges that connect the vertices. The mesh may additionally include data that associates a color, texture, or other such value with a vertices.

To encode a mesh, a V-DMC encoder may first deconstruct the mesh into a base mesh and displacement vectors. The base mesh is a decimated approximation of the mesh, meaning that the base mesh include fewer vertices than the mesh. The displacement vectors represent modifications to the base mesh that cause the base mesh, after being modified by the displacement vectors, to more closely resemble the original mesh.

This disclosure relates to encoding and decoding base mesh data. By introducing transforms and/or quantization into the encoding and corresponding inverse transforms and dequantization into the decoding of base mesh data, the techniques of this disclosure may improve the compression as judged, for example, by rate-distortion tradeoff achieved when coding base mesh data.

This disclosure will refer to base mesh attributes and texture attributes. Base mesh attributes generally refer to characteristics of the base mesh, such as positions (x,y,z) of the vertices and texture coordinates (x,y) that point to a texture map image pixel location. Base mesh attributes may also be referred to as vertex attributes. A texture attribute generally refers to the values, such as RGB values, at the pixel location in the texture map image.

Figure 1:
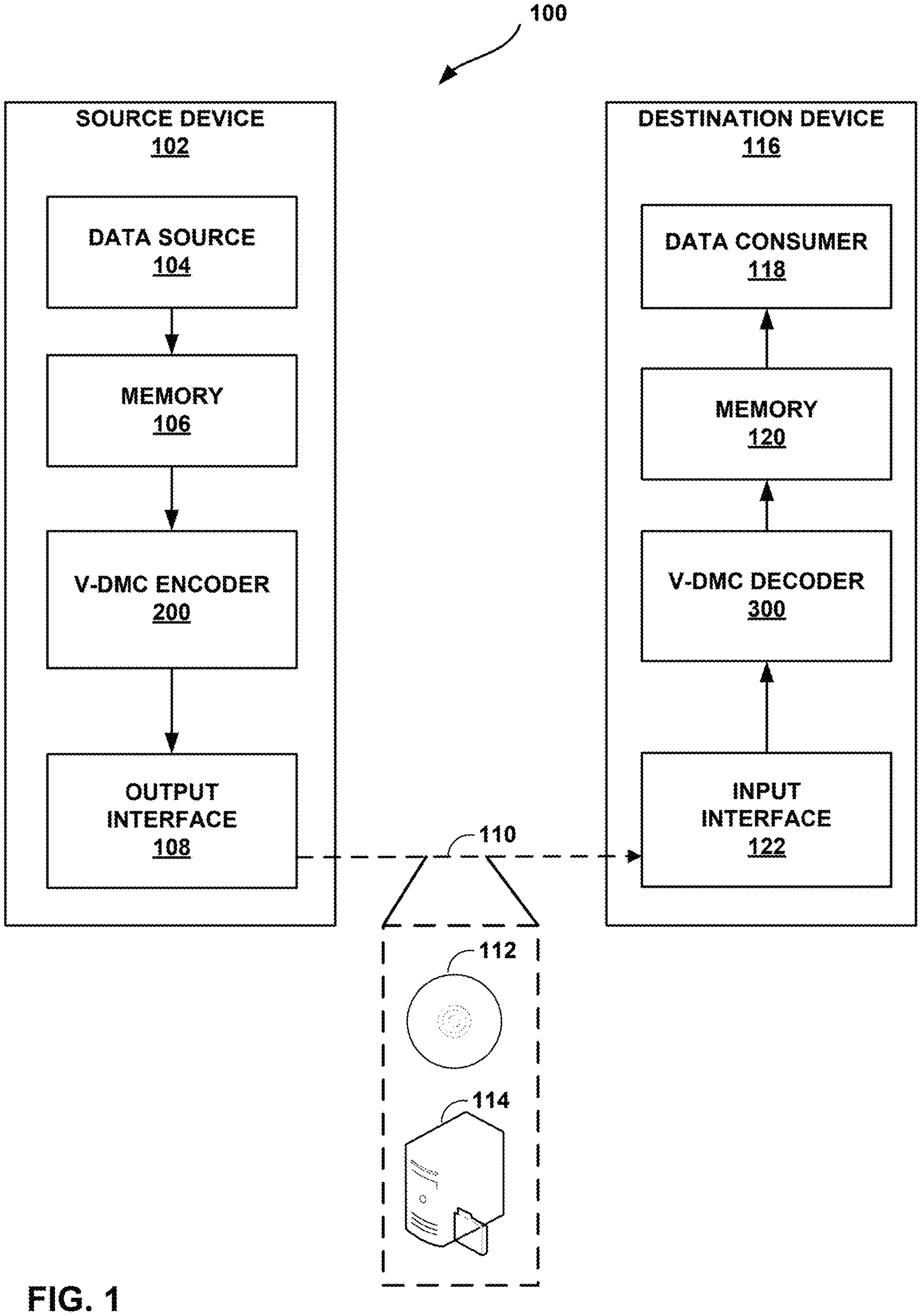
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) meshes. The coding may be effective in compressing and/or decompressing data of the meshes.

As shown in FIG. 1, system 100 includes a source device 102 and a destination device 116. Source device 102 provides encoded data to be decoded by a destination device 116. Particularly, in the example of FIG. 1, source device 102 provides the data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a V-DMC encoder 200, and an output interface 108. Destination device 116 includes an input interface 122, a V-DMC decoder 300, a memory 120, and a data consumer 118. In accordance with this disclosure, V-DMC encoder 200 of source device 102 and V-DMC decoder 300 of destination device 116 may be configured to apply the techniques of this disclosure related to displacement vector quantization. Thus, source device 102 represents an example of an encoding device, while destination device 116 represents an example of a decoding device. In other examples, source device 102 and destination device 116 may include other components or arrangements. For example, source device 102 may receive data from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to displacement vector quantization. Source device 102 and destination device 116 are merely examples of such devices in which source device 102 generates coded data for transmission to destination device 116. This disclosure refers to a "coding" device as a device that performs coding (encoding and/or decoding) of data. Thus, V-DMC encoder 200 and V-DMC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded data) and may provide a sequential series of "frames") of the data to V-DMC encoder 200, which encodes data for the frames. Data source 104 of source device 102 may include a mesh capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, mesh data may be computer-generated from scanner, camera, sensor or other data. For example, data source 104 may generate computer graphics-based data as the source data, or produce a combination of live data, archived data, and computer-generated data. In each case, V-DMC encoder 200 encodes the captured, pre-captured, or computer-generated data. V-DMC encoder 200 may rearrange the frames from the received order (sometimes referred to as "display order") into a coding order for coding. V-DMC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from V-DMC decoder 300. Additionally or alternatively, memory 106 and memory 120 may store software instructions executable by, e.g., V-DMC encoder 200 and V-DMC decoder 300, respectively. Although memory 106 and memory 120 are shown separately from V-DMC encoder 200 and V-DMC decoder 300 in this example, it should be understood that V-DMC encoder 200 and V-DMC decoder 300 may also include internal memories for functionally similar or equivalent purposes. Furthermore, memory 106 and memory 120 may store encoded data, e.g., output from V-DMC encoder 200 and input to V-DMC decoder 300. In some examples, portions of memory 106 and memory 120 may be allocated as one or more buffers, e.g., to store raw, decoded, and/or encoded data. For instance, memory 106 and memory 120 may store data representing a mesh.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to V-DMC encoder 200 and/or output interface 108, and destination device 116 may include an SoC device to perform the functionality attributed to V-DMC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by V-DMC encoder 200, which is also used by V-DMC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on meshes.

V-DMC encoder 200 and V-DMC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of V-DMC encoder 200 and V-DMC decoder 300 may be included in one or more encoders or decoders, either of which may be integrated as part of a combined encoder/decoder (CODEC) in a respective device. A device including V-DMC encoder 200 and/or V-DMC decoder 300 may comprise one or more integrated circuits, microprocessors, and/or other types of devices.

V-DMC encoder 200 and V-DMC decoder 300 may operate according to a coding standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, V-DMC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure describes techniques that may provide various improvements in the vertex attribute encoding for base meshes in the video-based coding of dynamic meshes (V-DMC), which is being standardized in MPEG WG7 (3DGH). In V-DMC, the base mesh connectivity is encoded using an edgebreaker implementation, and the base mesh attributes can be encoded using residual encoding with attribute prediction. This disclosure describes techniques to implement a transform and/or quantization on the attribute and/or the predictions and/or the residuals for the base mesh encoding, which may improve the coding performance of the base mesh encoding.

Working Group 7 (WG7), often referred to as the 3D Graphics and Haptics Coding Group (3DGH), is presently engaged in standardizing the video-based dynamic mesh coding (V-DMC) for XR applications. The current testing model includes preprocessing input meshes into simplified versions called "base meshes." These base meshes, often contain fewer vertices than the original mesh, are encoded using a base mesh coder also called a static mesh coder. The preprocessing also generates displacement vectors as well as a texture attribute map that are both encoded using a video encoder. If the mesh is encoded in a lossless manner, then the base mesh is no longer a simplified version and is used to encode the original mesh.

The base mesh encoder encodes the connectivity of the mesh as well as the attributes associated with each vertex which typically involves the position and a coordinate for the texture but are not limited to these attributes. The position includes 3D coordinates (x,y,z) of the vertex while, the texture is stored as a 2D UV coordinate (x,y) that points to a texture map image pixel location. The base mesh in V-DMC is encoded using an edgebreaker algorithm, while the connectivity is encoded using a CLERS op code. The residual of the attribute is encoded using prediction from the previously encoded/decoded vertices.

The edgebreaker algorithm is described in Jean-Eudes Marvie, Olivier Mocquard, [V-DMC] [EE4.4] An efficient Edgebreaker implementation, ISO/IEC JTC1/SC29/WG7, m63344, April 2023 (hereinafter "m63344"), which is hereby incorporated by reference. The CLERS op code is described in J. Rossignac, "3D compression made simple: Edgebreaker with ZipandWrap on a corner-table," in Proceedings International Conference on Shape Modeling and Applications, Genova, Italy, 2001 (hereinafter "Rossignac") and H. Lopes, G. Tavares, J. Rossignac, A. Szymczak and A. Safonova, "Edgebreaker: a simple compression for surfaces with handles." in ACM Symposium on Solid Modeling and Applications, Saarbrucken, 2002 (hereinafter "Lopes"), which are both hereby incorporated by reference.

The techniques of this disclosure may improve the base mesh encoding, which may also be referred to as static mesh encoding.

A detailed description of the proposal that was selected as the starting point for the V-DMC standardization can be found in the following documents, all of which are hereby incorporated by reference.

U.S. Provisional Patent Application 63/590,679, filed Oct. 16, 2023.

Khaled Mammou, Jungsun Kim, Alexandros Tourapis, Dimitri Podborski, Krasimir Kolarov, [V-CG] Apple's Dynamic Mesh Coding CfP Response, ISO/IEC JTC1/SC29/WG7, m59281, April 2022 (hereinafter "m59281").

V-DMC codec description, ISO/IEC JTC1/SC29/WG7, N00644, July. 2023 (hereinafter "V-DMC codec description").

WD 4.0 of V-DMC, ISO/IEC JTC1/SC29/WG7, N00680, January 2023 (hereinafter "N00680").

Figure 2:
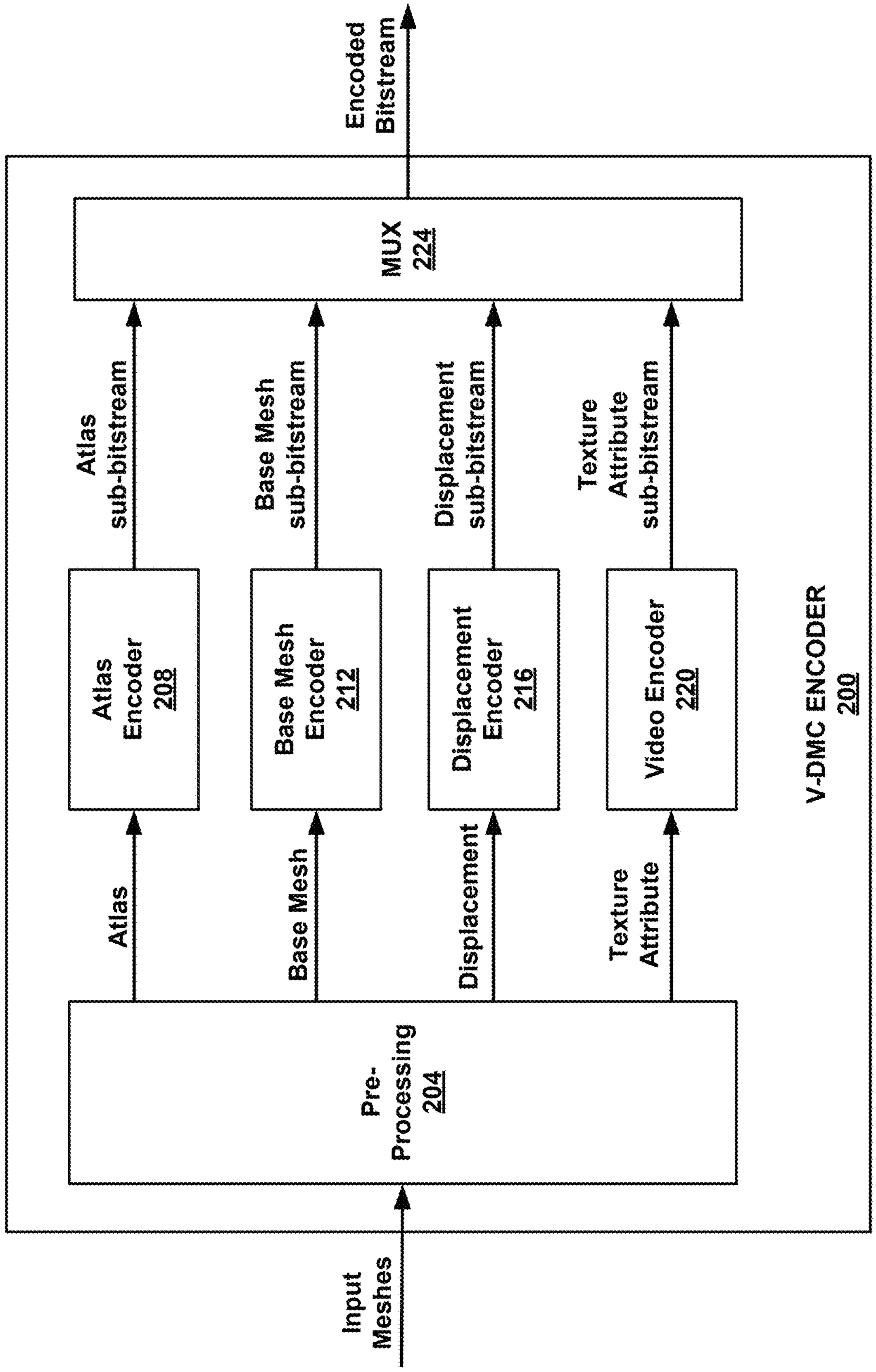
FIG. 2 shows an example implementation of a V-DMC encoder.
Figure 3:
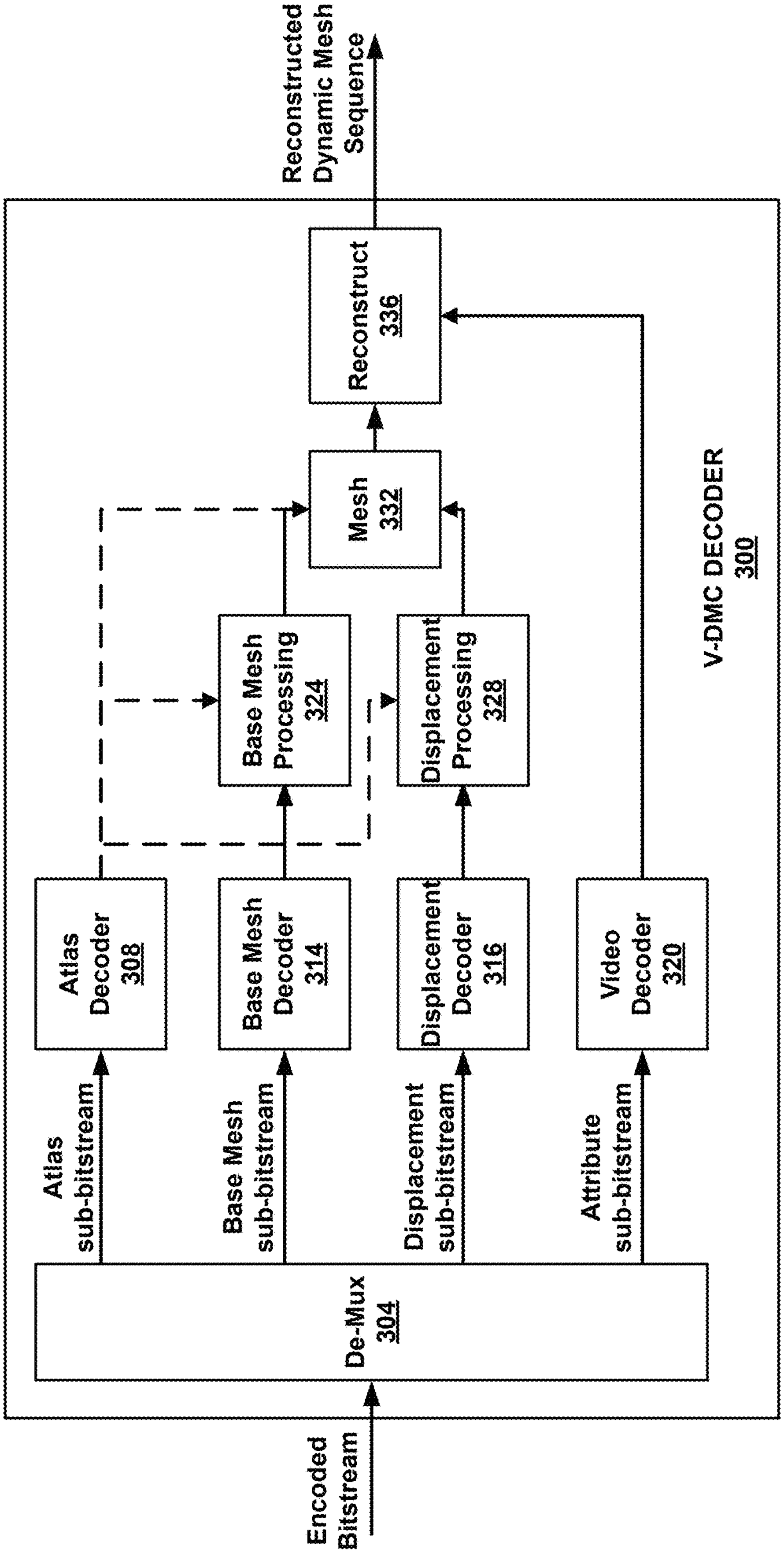
FIG. 3 shows an example implementation of a V-DMC decoder.

FIGS. 2 and 3 show the overall system model for the current V-DMC test model (TM) encoder (V-DM encoder 200 in FIG. 2) and decoder (V-DMC decoder 300 in FIG. 3) architecture. V-DMC encoder 200 performs volumetric media conversion, and V-DMC decoder 300 performs a corresponding reconstruction. The 3D media is converted to a series of sub-bitstreams: base mesh, displacement, and texture attributes. Additional atlas information is also included in the bitstream to enable inverse reconstruction, as described in N00680.

FIG. 2 shows an example implementation of V-DMC encoder 200. In the example of FIG. 2, V-DMC encoder 200 includes pre-processing unit 204, atlas encoder 208, base mesh encoder 212, displacement encoder 216, and video encoder 220. Pre-processing unit 204 receives an input mesh sequence and generates a base mesh, the displacement vectors, and the texture attribute maps. Base mesh encoder 212 encodes the base mesh. Displacement encoder 216 encodes the displacement vectors, for example as V3C video components or using arithmetic displacement coding. Video encoder 220 encodes the texture attribute components, e.g., texture or material information, using any video codec, such as the High Efficiency Video Coding (HEVC) Standard or the Versatile Video Coding (VVC) standard.

Aspects of V-DMC encoder 200 will now be described in more detail. Pre-processing unit 204 represents the 3D volumetric data as a set of base meshes and corresponding refinement components. This is achieved through a conversion of input dynamic mesh representations into a number of V3C components: a base mesh, a set of displacements, a 2D representation of the texture map, and an atlas. The base mesh component is a simplified low-resolution approximation of the original mesh in the lossy compression and is the original mesh in the lossless compression. The base mesh component can be encoded by base mesh encoder 212 using any mesh codec.

Figure 7:
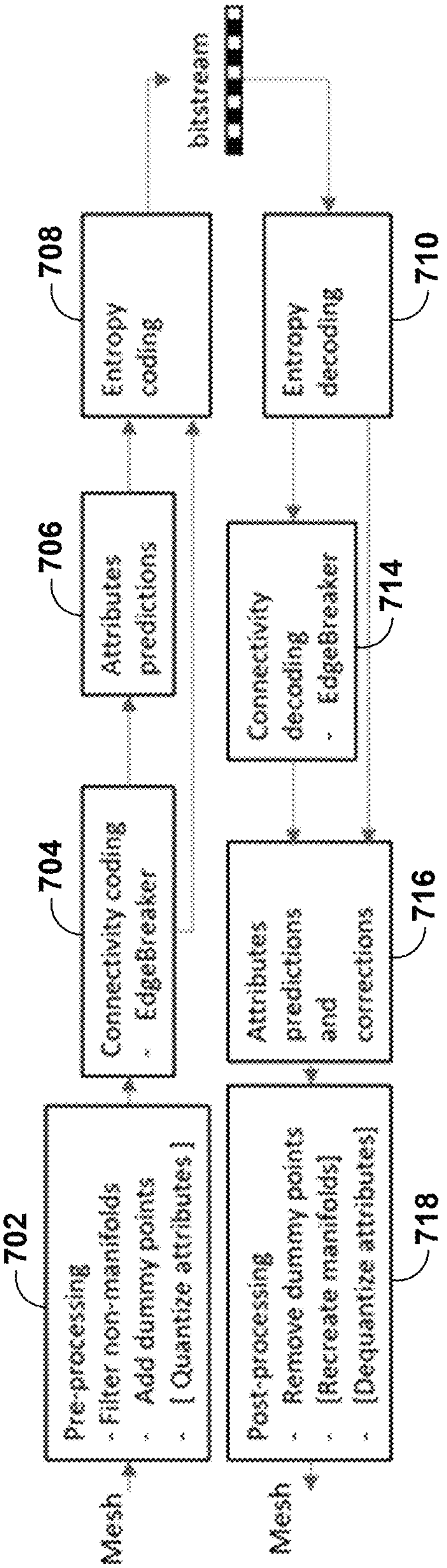
FIG. 7 shows an example implementation of a coding process for coding base mesh connectivity.

Base mesh encoder 212 is represented as a static mesh encoder in FIG. 7 and employs an implementation of the Edgebreaker algorithm, e.g., m63344, for encoding the base mesh where the connectivity is encoded using a CLERS op code, e.g., from Rossignac and Lopes, and the residual of the attribute is encoded using prediction from the previously encoded/decoded vertices' attributes.

Aspects of base mesh encoder 212 will now be described in more detail. One or more submeshes are input to base mesh encoder 212. Submeshes are generated by pre-processing unit 204. Submeshes are generated from original meshes by utilizing semantic segmentation. Each base mesh may include of one or more submeshes.

Base mesh encoder 212 may process connected components. Connected components include of a cluster of triangles that are connected by their neighbors. A submesh can have one or more connected components. Base mesh encoder 212 may encode one "connected component" at a time for connectivity and attributes encoding and then performs entropy encoding on all "connected components".

FIG. 3 shows an example implementation of V-DMC decoder 300. In the example of FIG. 3, V-DMC decoder 300 includes demultiplexer 304, atlas decoder 308, base mesh decoder 314, displacement decoder 316, video decoder 320, base mesh processing unit 324, displacement processing unit 328, mesh generation unit 332, and reconstruction unit 336.

Demultiplexer 304 separates the encoded bitstream into an atlas sub-bitstream, a base-mesh sub-bitstream, a displacement sub-bitstream, and a texture attribute sub-bitstream. Atlas decoder 308 decodes the atlas sub-bitstream to determine the atlas information to enable inverse reconstruction. Base mesh decoder 314 decodes the base mesh sub-bitstream, and base mesh processing unit 324 reconstructs the base mesh. Displacement decoder 316 decodes the displacement sub-bitstream, and displacement processing unit 328 reconstructs the displacement vectors. Mesh generation unit 332 modifies the base mesh based on the displacement vector to form a displaced mesh.

Video decoder 320 decodes the texture attribute sub-bitstream to determine the texture attribute map, and reconstruction unit 336 associates the texture attributes with the displaced mesh to form a reconstructed dynamic mesh.

Figure 4:
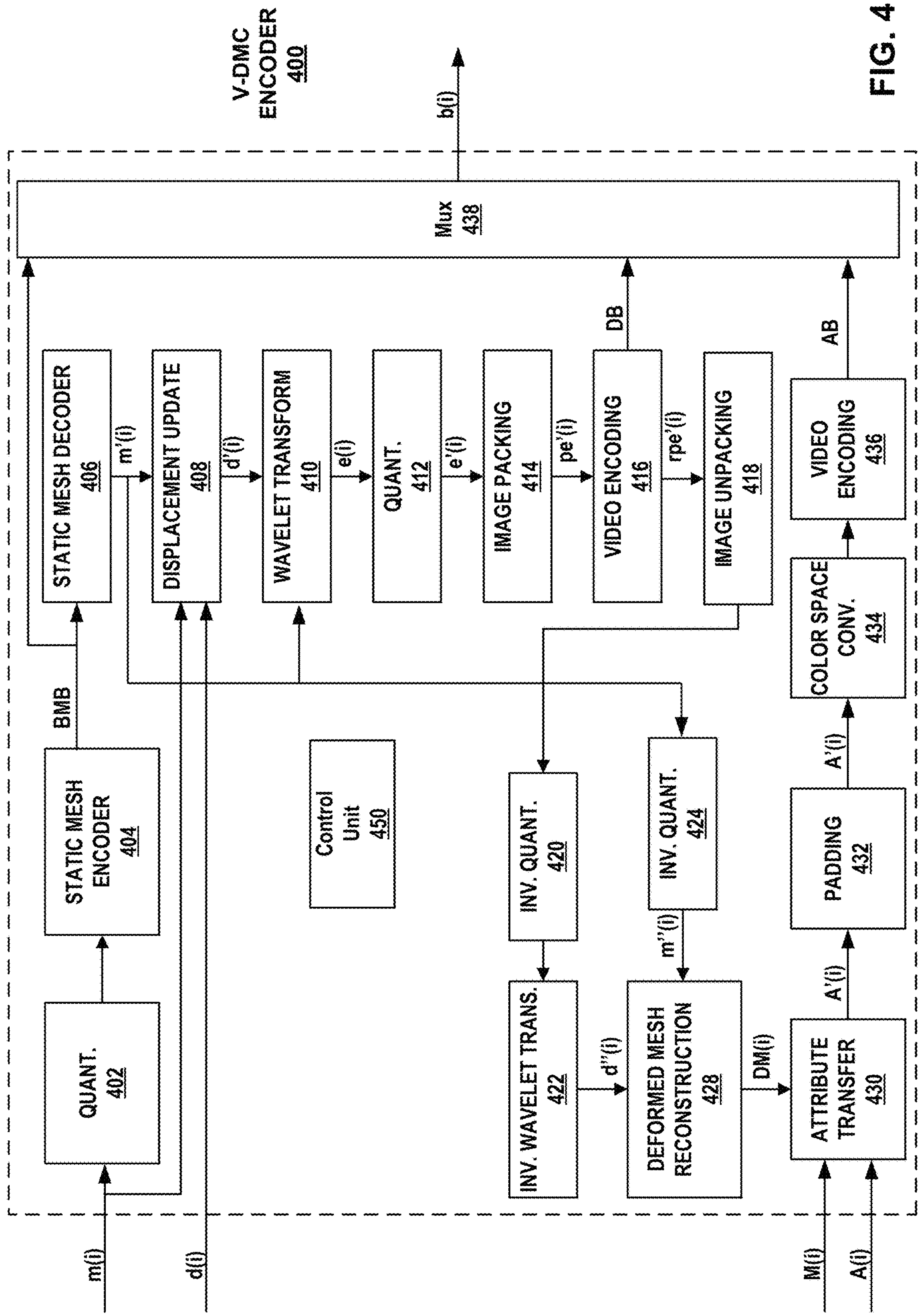
FIG. 4 shows an example implementation of an intra-mode encoder for V-DMC.

FIG. 4 shows V-DMC encoder 400, which is configure to implement an intra encoding process. V-DMC encoder 400 represents an example implementation of V-DMC encoder 200.

FIG. 4 includes the following abbreviations:

m(i)—Base mesh
d(i)—Displacements
m"(i)—Reconstructed Base Mesh
d"(i)—Reconstructed Displacements
A(i)—Attribute Map
A'(i)—Updated Attribute Map
M(i)—Static/Dynamic Mesh
DM(i)—Reconstructed Deformed Mesh
m'(i)—Reconstructed Quantized Base Mesh
d'(i)—Updated Displacements
e(i)—Wavelet Coefficients
e'(i)—Quantized Wavelet Coefficients
pe'(i)—Packed Quantized Wavelet Coefficients
rpe'(i)—Reconstructed Packed Quantized Wavelet Coefficients
AB—Compressed attribute bitstream
DB—Compressed displacement bitstream
BMB—Compressed base mesh bitstream V-DMC encoder 200 receives base mesh m(i) and displacements d(i), for example from a pre-processing system and also retrieves mesh M(i) and attribute map A(i).

Quantization unit 402 quantizes the base mesh, and static mesh encoder 404 encodes the quantized based mesh to generate a compressed base mesh bitstream.

Displacement update unit 408 uses the reconstructed quantized base mesh m'(i) to update the displacement field d(i) to generate an updated displacement field d'(i). This process considers the differences between the reconstructed base mesh m'(i) and the original base mesh m(i). By exploiting the subdivision surface mesh structure, wavelet transform unit 410 applies a wavelet transform to d'(i) to generate a set of wavelet coefficients. The scheme is agnostic of the transform applied and may leverage any other transform, including the identity transform. Quantization unit 412 quantizes wavelet coefficients, and image packing unit 414 packs the quantized wavelet coefficients into a 2D image/video that can be compressed using a traditional image/video encoder to generate a displacement bitstream.

Attribute transfer unit 430 converts the original attribute map A(i) to an updated attribute map that corresponds to the reconstructed deformed mesh DM(i). Padding unit 432 pads the updated attributed map by, for example, filling patches of the frame that have empty samples with interpolated samples that may improve coding efficiency and reduce artifacts. Color space conversion unit 434 converts the attribute map into a different color space, and video encoding unit 436 encodes the updated attribute map in the new color space, using for example a video codec, to generate an attribute bitstream.

Multiplexer 438 combines the compressed attribute bitstream, compressed displacement bitstream, and compressed base mesh bitstream into a single compressed bitstream.

Image unpacking unit 418 and inverse quantization unit 420 apply image unpacking and inverse quantization to the reconstructed packed quantized wavelet coefficients generated by video encoding unit 416 to obtain the reconstructed version of the wavelet coefficients. Inverse wavelet transform unit 422 applies and inverse wavelet transform to the reconstructed wavelet coefficient to determine reconstructed displacements d"(i).

Inverse quantization unit 424 applies an inverse quantization to the reconstructed quantized base mesh m'(i) to obtain a reconstructed base mesh m"(i). Deformed mesh reconstruction unit 428 subdivides m"(i) and applies the reconstructed displacements d"(i) to its vertices to obtain the reconstructed deformed mesh DM(i).

Image unpacking unit 418, inverse quantization unit 420, inverse wavelet transform unit 422, and deformed mesh reconstruction unit 428 represent a displacement decoding loop. Inverse quantization unit 424 and deformed mesh reconstruction unit 428 represent a base mesh decoding loop. V-DMC encoder 400 includes the displacement decoding loop and the base mesh decoding loop so that V-DMC encoder 400 can make encoding decisions, such as determining an acceptable rate-distortion tradeoff, based on the same decoded mesh that a mesh decoder will generate, which may include distortion due to the quantization and transforms. V-DMC encoder 400 may also use decoded versions of the base mesh, reconstructed mesh, and displacements for encoding subsequent base meshes and displacements.

Control unit 450 generally represents the decision making functionality of V-DMC encoder 400. During an encoding process, control unit 450 may, for example, make determinations with respect to mode selection, rate allocation, quality control, and other such decisions.

Figure 5:
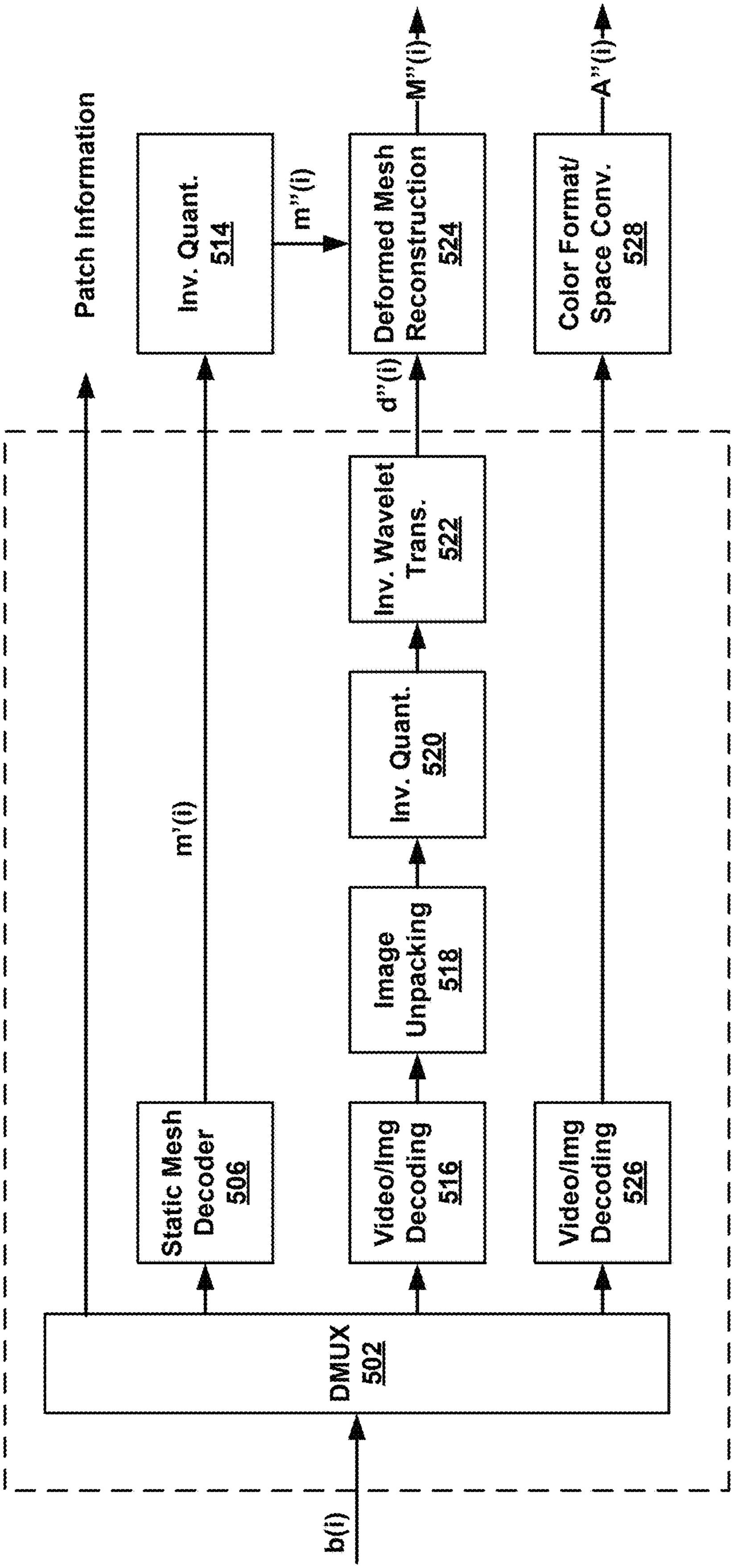
FIG. 5 shows an example implementation of an intra-mode decoder for V-DMC.

FIG. 5 shows a block diagram of an intra decoder which may, for example, be part of V-DMC decoder 300. De-multiplexer (DMUX) 502 separates compressed bitstream (bi) into a mesh sub-stream, a displacement sub-stream for positions and potentially for each vertex attribute, zero or more attribute map sub-streams, and an atlas sub-stream containing patch information in the same manner as in V3C/V-PCC.

De-multiplexer 502 feeds the mesh sub-stream to static mesh decoder 506 to generate the reconstructed quantized base mesh m'(i). Inverse quantization unit 514 inverse quantizes the base mesh to determine the decoded base mesh m"(i). Video/image decoding unit 516 decodes the displacement sub-stream, and image unpacking unit 518 unpacks the image/video to determine quantized transform coefficients, e.g., wavelet coefficients. Inverse quantization unit 520 inverse quantizes the quantized transform coefficients to determine dequantized transform coefficients. Inverse transform unit 522 generates the decoded displacement field d"(i) by applying the inverse transform to the unquantized coefficients. Deformed mesh reconstruction unit 524 generates the final decoded mesh (M"(i)) by applying the reconstruction process to the decoded base mesh m"(i) and by adding the decoded displacement field d"(i). The attribute sub-stream is directly decoded by video/image decoding unit 528 to generate an attribute map A"(i). Color format/space conversion unit may convert the attribute map into a different format or color space.

Figure 6:
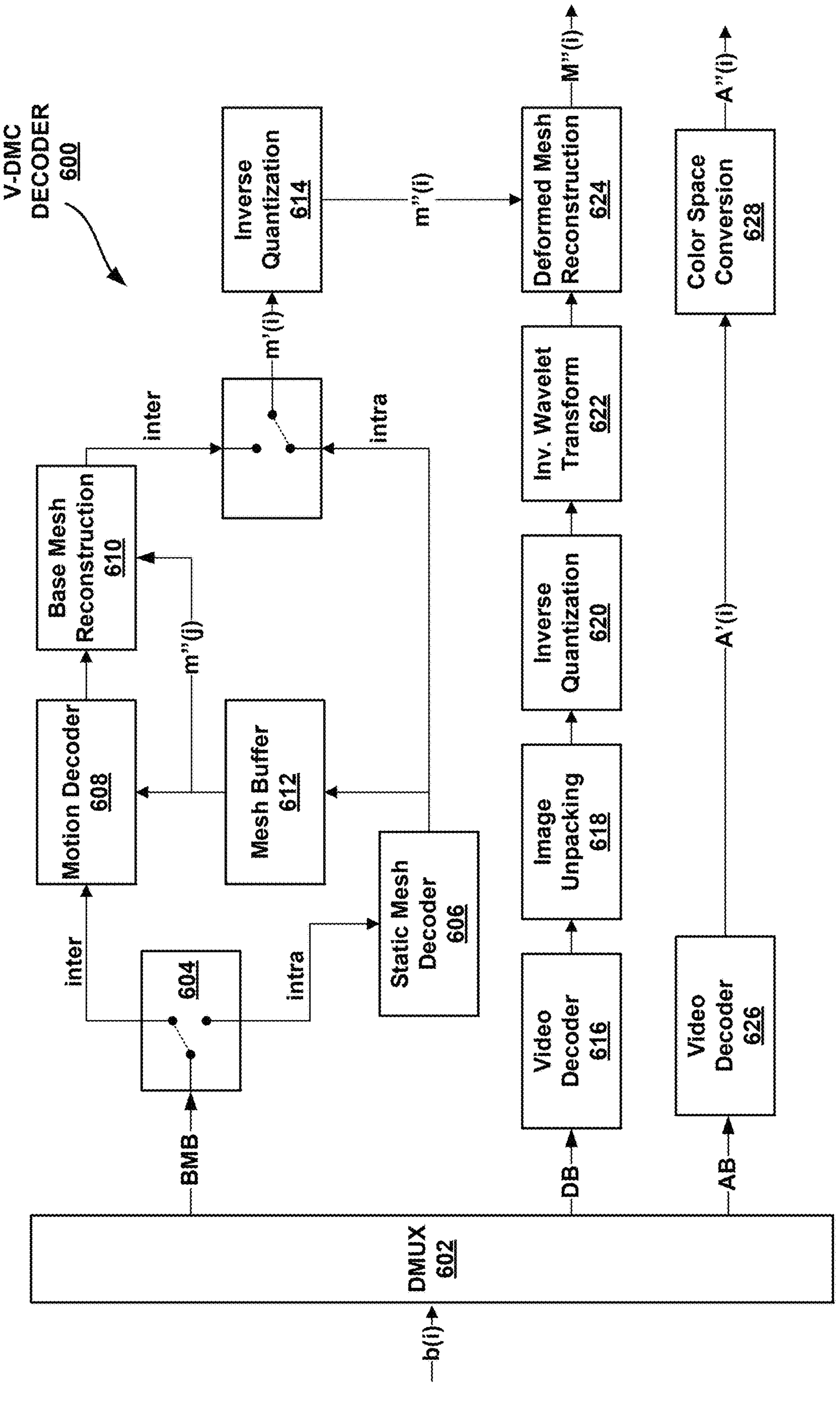
FIG. 6 shows an example implementation of a V-DMC decoder.

FIG. 6 shows V-DMC decoder 600, which may be configured to perform either intra- or inter-decoding. V-DMC decoder 600 represents an example implementation of V-DMC decoder 300. The processes described with respect to FIG. 6 may also be performed, in full or in part, by V-DMC encoder 200.

V-DMC decoder 600 includes demultiplexer (DMUX) 602, which receives compressed bitstream b (i) and separates the compressed bitstream into a base mesh bitstream (BMB), a displacement bitstream (DB), and an attribute bitstream (AB). Mode select unit 604 determines if the base mesh data is encoded in an intra mode or an inter mode. If the base mesh is encoded in an intra mode, then static mesh decoder 606 decodes the mesh data without reliance on any previously decoded meshes. If the base mesh is encoded in an inter mode, then motion decoder 608 decodes motion, and base mesh reconstruction unit 610 applies the motion to an already decoded mesh (m"(i)) stored in mesh buffer 612 to determine a reconstructed quantized base mesh (m'(i))). Inverse quantization unit 614 applies an inverse quantization to the reconstructed quantized base mesh to determine a reconstructed base mesh (m"(i)).

Video decoder 616 decodes the displacement bitstream to determine a set or frame of quantized transform coefficients. Image unpacking unit 618 unpacks the quantized transform coefficients. For example, video decoder 616 may decode the quantized transform coefficients into a frame, where the quantized transform coefficients are organized into blocks with particular scanning orders. Image unpacking unit 618 converts the quantized transform coefficients from being organized in the frame into an ordered series. In some implementations, the quantized transform coefficients may be directly coded, using a context-based arithmetic coder for example, and unpacking may be unnecessary.

Regardless of whether the quantized transform coefficients are decoded directly or in a frame, inverse quantization unit 620 inverse quantizes, e.g., inverse scales, quantized transform coefficients to determine de-quantized transform coefficients. Inverse wavelet transform unit 622 applies an inverse transform to the de-quantized transform coefficients to determine a set of displacement vectors. Deformed mesh reconstruction unit 624 deforms the reconstructed base mesh using the decoded displacement vectors to determine a decoded mesh (M"(i)).

Video decoder 626 decodes the attribute bitstream to determine decoded attribute values (A'(i)), and color space conversion unit 628 converts the decoded attribute values into a desired color space to determine final attribute values (A"(i)). The final attribute values correspond to attributes, such as color or texture, for the vertices of the decoded mesh.

FIG. 7: Overview of the complete Edgebreaker mesh codec, top row is the encoding line, bottom row is the decoding line, as described in m63344. FIG. 7 illustrates the end-to-end mesh codec based on Edgebreaker, which includes the following primary steps:

Encoding:

- Pre-processing (702): Initially, a pre-processing is performed to rectify potential connectivity issues in the input mesh, such as non-manifold edges and vertices. This step is crucial because the EdgeBreaker algorithm employed cannot operate with such connectivity problems. Addressing non-manifold issues may involve duplicating some vertices, which are tracked for later merging during decoding. This optimization reduces the number of points in the decoded mesh but necessitates additional information in the bitstream. Dummy points are also added in this pre-processing phase to fill potential surface holes, which EdgeBreaker does not handle. The holes are subsequently encoded by generating "virtual" dummy points by encoding dummy triangles attached to them, without requiring 3D position encoding. If needed, the vertex attributes are quantized in the pre-processing.
- Connectivity Encoding (704): Next, the mesh's connectivity is encoded using a modified Edgebreaker algorithm, generating a CLERS table along with other memory tables used for attribute prediction.
- Attribute Prediction (706): Vertex attributes are predicted, starting with geometry position attributes, and extending to other attributes, some of which may rely on position predictions, such as for texture UV coordinates.
- Bitstream Configuration (708): Finally, configuration and metadata are included in the bitstream. This includes the entropy coding of CLERS tables and attribute residuals.

Decoding:

- Entropy Decoding (710): The decoding process commences with the decoding of all entropy-coded sub-bitstreams.
- Connectivity Decoding (714): Mesh connectivity is reconstructed using the CLERS table and the Edgebreaker algorithm, with additional information to manage handles that describe topology.
- Attributes Predictions and Corrections (716): Vertex positions are predicted using the mesh connectivity and a minimal set of 3D coordinates. Subsequently, attribute residuals are applied to correct the predictions and obtain the final vertex positions. Other attributes are then decoded, potentially relying on the previously decoded positions, as is the case with UV coordinates. The connectivity of attributes using separate index tables is reconstructed using binary seam information that is entropy coded on a per-edge basis.
- Post-processing (718): In a post-processing stage, dummy triangles are removed. Optionally, non-manifold issues are recreated if the codec is configured for lossless coding. Vertex attributes that were quantized during encoding may also be optionally dequantized.

Aspects of attribute coding in base mesh coding will now be described. Attribute coding uses a prediction scheme to find the residuals between the predicted and actual attributes. Finally, the residuals are entropy encoded into a base mesh attribute bitstream. Each vertex attribute is encoded differently. The geometry for 3D position and the UV coordinates for the texture are both encoded using prediction processes. To compute these predictions, the multi-parallelogram technique is utilized for geometry encoding, as described in Cohen and Isenburg, while the min stretch process is employed for UV coordinates encoding, as described in I. M. and S. J., "Compressing Texture Coordinates with Selective Linear Predictions," in Computer Graphics International, Tokyo, Japan, 2003, which is hereby incorporated by reference.

It is worth noting that during the prediction of a corner, it can be ensured that its associated triangle fan is always complete, and each of its corners has a valid opposite. This is achieved by employing dummy points to fill any holes. In fact, even a single triangle would be transformed into a pyramid composed of four triangles in terms of connectivity.

The code for attribute compression is shown in Table 1. The geometry prediction uses multi-parallelogram scheme shown in Table 2. The Min stretch prediction scheme for UV coordinates is described in Table 3 and Table 4.

The processing of the multi-parallelogram for a given corner involves performing a lookup all around a vertex of the corner to calculate and aggregate each parallelogram prediction, utilizing opposite corners. A parallelogram used to predict a corner from a sibling corner is considered valid for prediction only if the vertices of the corner itself, the sibling corner, and their shared vertex have been previously processed by the connectivity recursion, which triggers the prediction. To verify this condition, the vertex marking table (designated as M) is employed. This table contains elements set to true for vertices that have already been visited by the connectivity encoding loop. In the parallelogram prediction, the parallelogram moves in an anti-clockwise direction by swinging around the "triangle fan". If in a parallelogram, the next, previous, and opposite vertices are available, then that parallelogram (and the three other vertices) is used to predict the current vertices' position.

At the end of the loop, the sum of predictions is divided by the number of valid parallelograms that have been identified. The result is rounded and subsequently used to compute the residual (position-predicted), which is appended to the end of the output vertices table. In cases where no valid parallelogram is found, a fallback to delta coding is employed.

For encoding predictions of UV coordinates using primary index tables, the procedure follows a similar extension to that used for positions. The key distinction lies in the utilization of the min stretch approach rather than multi-parallelogram for prediction. Additionally, predictions are not summed up; instead, the process halts at the first valid (in terms of prediction) neighbor within the triangle fan, and the min stretch is computed. Further details of the uvEncodeWithPrediction procedure can be found in Table 3, while the actual prediction statement is illustrated in Table 4.

The code shown in Tables 1~4 is only for the encoding side (encoder). The decoder follows similar steps but in reverse.

TABLE 1

Encoder Attributes

```
void EBBasicEncoder::encodeMainIndexAttributes(const int c, const int v)
{
  const auto& V = _ovTable.V;
  const auto& G = _ovTable.positions;
  const auto& UV = _ovTable.uvcoords;
  const auto& OTC = _ovTable.OTC;
  const bool predictUVs = (UV.size( ) && !OTC.size( )); // predict UVs in first pass if
no separate index
  bool bypasspos = false;
  if (cfg.deduplicate)
  {
    // check for duplicated positions
    const auto dupIt = _ovTable.duplicatesMap.find(_ovTable.V[c]);
    if (dupIt != _ovTable.duplicatesMap.end( ))
    {
      isVertexDup.push_back(true);
      oDuplicateSplitVertexIdx.push_back(dupIt->second);
    }
    else
      isVertexDup.push_back(false);
    Vcur++;
    // early return if duplicate already coded
    if (dupIt != _ovTable.duplicatesMap.end( ))
    {
      if (processedDupIdx.find(dupIt->second) != processedDupIdx.end( ))
      {
        bypasspos = true; // no need to encode as already processed
        posSkipDup++;
      }
      else
        processedDupIdx.insert(dupIt->second);
    }
    // then use duplicate pos info to replicate the value when decoding
  }
  // reindex the dummy vertives
  if (isCornerVertexDummy(c))
  {
    // reindexation is dependent on how some values are separately encoded
    if (cfg.posPred != EBConfig::PosPred::MPARA)
      oDummies.push_back(oVertices.size( ));
    else
      oDummies.push_back(oVertices.size( ) + sVertices.size( ) + oDummies.size( ) +
posSkipDup);
  }
  if (!bypasspos)
  {
    // positions
    switch (cfg.posPred) {
    case EBConfig::PosPred::NONE:
      oVertices.push_back(G[V[c]]);
      break;
```

TABLE 1-continued

| Encoder Attributes |
| --- |

```
    case EBConfig::PosPred::MPARA:
      posEncodeWithPrediction(c, v);
      break;
    }
    // UVCoords
    if (predictUVs) {
      switch (cfg.uvPred) {
      case EBConfig::UvPred::NONE:
        oUVCoords.push_back(UV[V[c]]);
        break;
      case EBConfig::UvPred::STRETCH:
        uvEncodeWithPrediction(c, v);
        break;
      }
    }
  }
}
```

TABLE 2

| posEncodeWithPrediction using multi-parallelogram |
| --- |

```
void EBBasicEncoder::posEncodeWithPrediction(const int c, const int v)
{
  const auto MAX_PARALLELOGRAMS = 4;
  const auto& OV = _ovTable;
  const auto& V = _ovTable.V;          // NO CC SHIFTING
  const auto& O = _ovTable.O;          // NO CC SHIFTING
  const auto& G = _ovTable.positions;      // NO CC SHIFTING
  // use a separate table for start and dummy vertices => less unique symbols for
entropy coding
  if ((v == 0) || isCornerVertexDummy(c))
  {
    if (v == 0)
      sVertices.push_back(G[V[c]]);  // start point, store as global coordinate
    return;
  }
  switch (v) {                         // case 0 already handled along with
dummies
  case 1:                          // store delta,
  case 2:                          // store delta,
    oVertices.push_back(G[V[c]] - G[V[OV.p(c)]]); break;
  default:                         // store parallelogram estimation
    bool prevIsDummy = isCornerVertexDummy(OV.p(c));
    // search for some parallelogram estimations around the vertex of the corner
    int count = 0;
    int altC = c;
    glm::vec3 predPos(0, 0, 0);      // the predicted position
    do                             // loop through corners attached to the current
vertex
    {
      if (count >= MAX_PARALLELOGRAMS) break;
      if (((!isCornerVertexDummy(O[altC])) &&
        (!isCornerVertexDummy(OV.p(altC))) &&
        (!isCornerVertexDummy(OV.n(altC)))) &&
        ((M[V[O[altC]]] > 0) && (M[V[OV.p(altC)]] > 0) && (M[V[OV.n(altC)]] >
0)))
      {
        // parallelogram prediction estG = prevG + nextG - oppoGd
        glm::vec3 estG = G[V[OV.p(altC)]] + G[V[OV.n(altC)]] - G[V[O[altC]]];
        predPos += estG;               // accumulate parallelogram predictions
        ++count;
      }
      altC = OV.p(O[OV.p(altC)]);         // swing around the triangle fan
```

TABLE 2-continued posEncodeWithPrediction using multi-parallelogram

```
    } while (altC != c);
    if (count > 0)              // use parallelogram prediction when possible
      predPos = glm::round(predPos / glm::vec3(count));      // divide and round each
component of vector predPos
    else                        // or fallback to delta with available values
      // G[V[OV.n(c)]] cannot be dummy if prevIsDummy and is necessarily marked
      predPos = prevIsDummy ? G[V[OV.n(c)]] : G[V[OV.p(c)]];
    oVertices.push_back(G[V[c]] - predPos); // store the residual = position -
predicted
  }                             // end of switch
}
```

TABLE 3 uvEncodeWithPrediction

```
void EBBasicEncoder::uvEncodeWithPrediction(const int c, const int v) {
  auto& OV = _ovTable;
  auto& V = _ovTable.V;
  auto& O = _ovTable.O;
  auto& G = _ovTable.positions;
  auto& UV = _ovTable.uvcoords;
  // use a separate table for start and dummy uv coords => less unique symbols for
entropy coding
  if ((v == 0) || isCornerVertexDummy(c))
  {
    if (v == 0)
      sUVCoords.push_back(UV[V[c]]);          // start point, store as global
coordinate
    // this introduces a shift to be handled when decoding as no related
oUVCoords.push_back exist
    return;
  }
  // switch on vertex index. case 0 already handled with dummies
  switch (v) {
  case 1:                       // delta,
  case 2:                       // delta,
    oUVCoords.push_back(UV[V[c]] - UV[V[OV.p(c)]]); break;
  default:                      // parallelogram
    bool prevIsDummy = isCornerVertexDummy(OV.p(c));
    bool nextIsDummy = isCornerVertexDummy(OV.n(c));
    bool predWithDummies = nextIsDummy || prevIsDummy;
    if (predWithDummies)
    {
      int count = 0;
      bool last = false;
      int altC = c;
      glm::vec3 predPos(0.0, 0.0, 0.0);
      do                  // loop through corners attached to the current vertex
      {
        if (count >= 1) break;      // no multiple predictions, stop on first corner
found
        if ((c != altC) && isCornerVertexDummy(altC))
        { // stop after looping in both directions or if a complete turn achieved
          if (last) break;
          altC = c;
          last = true;
        }
        // ensure that p.n from altC with same V[altC] are already decoded and are not
dummies
        else if (((!isCornerVertexDummy(OV.p(altC))) &&
(!isCornerVertexDummy(OV.n(altC))))
          && ((M[V[OV.p(altC)]] > 0) && (M[V[OV.n(altC)]] > 0)))
        {
          glm::vec2 estUV(0, 0);
          glm::dvec2 firstestUV(0, 0);
          predictUV(altC, estUV, firstestUV, V, true, true, prevIsDummy);
          oUVCoords.push_back(UV[V[c]] - glm::round(estUV));
          ++count;
        }
        altC = (!last) ? OV.p(O[OV.p(altC)]) : OV.n(O[OV.n(altC)]); // swing right or
left
      } while (altC != c);
      if (count == 0) // no corner found
      {
```

TABLE 3-continued uvEncodeWithPrediction

```
            glm::vec2 predUV = prevIsDummy ? UV[V[OV.n(c)] : UV[V[OV.p(c)]];
            const auto resUV = UV[V[c]] − predUV;
            oUVCoords.push_back(resUV);
          }
        }
        else
        {//without dummy vertex
          int count = 0;
          int altC = c;
          glm::vec2 predUV(0, 0);
          bool first = true;
          glm::dvec2 firstestUV(0, 0);
          do {
            glm::vec2 estUV(0, 0);
            if (((!isCornerVertexDummy(OV.p(altC))) &&
              (!isCornerVertexDummy(OV.n(altC)))) &&
              ((M[V[OV.p(altC)]] > 0) && (M[V[OV.n(altC)]] > 0)))
            {
              predictUV(altC, estUV, firstestUV, V, false, first);
              predUV += estUV;
              ++count;
            }
            altC = OV.p(O[OV.p(altC)]);
            first = false;
          } while (altC != c);
          if (count > 0) {
            predUV = glm::round(predUV / glm::vec2(count));
            oUVCoords.push_back(UV[V[c]] − predUV);
          }
        }
        break;
    } // end of switch
}
```

TABLE 4

PredictUV

```
// c corner to use for the prediction,
// predWithDummies boolean to predict using the dummy branch
// prevIsDummy set to true if previous corner is a dummy point (default to false)
void EBBasicEncoder::predictUV(const int c, glm::vec2& predUV, glm::dvec2&
firstpredUV, const std::vector<int>& indices, bool predWithDummies, bool first, bool
prevIsDummy)
{
    const auto& OV = _ovTable;
    const auto& V = _ovTable.V;
    const auto& G = _ovTable.positions;
    const auto& UV = _ovTable.uvcoords;
    const auto& IDX = indices;
    const auto& O = _ovTable.O;
    const auto& ov = _ovTable;
    // uv predictions are not accumulated, stop on first
    glm::dvec2 uvPrev = UV[IDX[OV.p(c)]];
    glm::dvec2 uvNext = UV[IDX[OV.n(c)]];
    glm::dvec2 uvCurr = UV[IDX[c]];
    glm::dvec3 gPrev = G[V[OV.p(c)]];
    glm::dvec3 gNext = G[V[OV.n(c)]];
    glm::dvec3 gCurr = G[V[c]];
    glm::dvec3 gNgP = gPrev − gNext;
    glm::dvec3 gNgC = gCurr − gNext;
    glm::dvec2 uvNuvP = uvPrev − uvNext;
    double gNgP_dot_gNgC = glm::dot(gNgP, gNgC);
    double d2_gNgP = glm::dot(gNgP, gNgP);
    if (d2_gNgP > 0)
    {
        glm::dvec2 uvProj = uvNext + uvNuvP * (gNgP_dot_gNgC / d2_gNgP);
        glm::dvec3 gProj = gNext + gNgP * (gNgP_dot_gNgC / d2_gNgP);
        double d2_gProj_gCurr = glm::dot(gCurr − gProj, gCurr − gProj);
        const glm::dvec2 uvProjuvCurr = glm::dvec2(uvNuvP.y, −uvNuvP.x) *
std::sqrt(d2_gProj_gCurr / d2_gNgP);
        glm::dvec2 predUV0(uvProj + uvProjuvCurr);
        glm::dvec2 predUV1(uvProj − uvProjuvCurr);
```

TABLE 4-continued

| PredictUV |
| --- |

```
    if (first) {
        //the first triangle
        bool useOpp = false;
        bool flag = false;
        if (ov.OTC.size( )) {
            // if hasUV and separate table
            if (IDX[O[c]] >= 0) {
                if (MC[IDX[O[c]]] > 0) {
                    flag = true;
                }
            }
        }
        else {
            if (IDX[O[c]] >= 0) {
                if ((M[IDX[O[c]]] > 0)&&(!isCornerVertexDummy(O[c]))) {
                    flag = true;
                }
            }
        }
        if (flag) {
            glm::dvec2 uvOpp = UV[IDX[O[c]]];
            float triangleArea_o = abs(0.5 * (uvNext[0] * uvPrev[1] + uvPrev[0] *
uvOpp[1] + uvOpp[0] *
        uvNext[1] - uvNext[0] * uvOpp[1] - uvPrev[0] * uvNext[1] - uvOpp[0] *
        uvPrev[1]));
            if (triangleArea_o < DBL_EPSILON) {
                //If the texture triangle is a degenerate triangle, do not use opposite corner
                useOpp = false;
            }
            else {
                useOpp = true;
            }
        }
        if (useOpp) {
            glm::dvec2 uvOpp = UV[IDX[O[c]]];
            if (length(uvOpp - predUV0) < length(uvOpp - predUV1)) {
                predUV = predUV1;
            }
            else {
                predUV = predUV0;
                }
        }
        else {
            bool orientation = length(uvCurr - predUV0) < length(uvCurr - predUV1);
            predUV = round(orientation ? predUV0 : predUV1);
            glm::vec2 resUV = UV[IDX[c]] - predUV;
            orientations.push_back(orientation);
        }
        firstpredUV = predUV;
    }
    else {
        if (length(firstpredUV - predUV0) < length(firstpredUV - predUV1)) {
            predUV = predUV0;
        }
        else {
            predUV = predUV1;
        }
    }
  }
  else
  {
    if (predWithDummies)                    // if next or prev corner is a dummy
point
    {
        predUV = prevIsDummy ? UV[IDX[OV.n(c)]] : UV[IDX[OV.p(c)]];
    }
    else                        // else average the two predictions
    {
        predUV = round((UV[IDX[OV.n(c)]] + UV[IDX[OV.p(c)]]) / 2.0f);
    }
    glm::vec2 resUV = UV[IDX[c]] - predUV;
  }
}
```

Currently, the V-DMC software involves a base mesh encoder. The base mesh encoder encodes both the attributes and the connectivity of the triangles and vertices. The attributes are typically encoded using a prediction scheme to predict the vertex attribute using previously visited/encoded/decoded vertices. Then the prediction is subtracted from the actual attribute value to obtain the residual. Finally, the residual attribute value is encoded using an entropy encoder to obtain the encoded base mesh attribute bitstream. The attribute bitstream which contains vertex attribute usually has the geometry/position attribute and the UV coordinates (texture attribute) but can contain any number of attributes like normals, per vertex RGB values, etc.

Figure 8A:
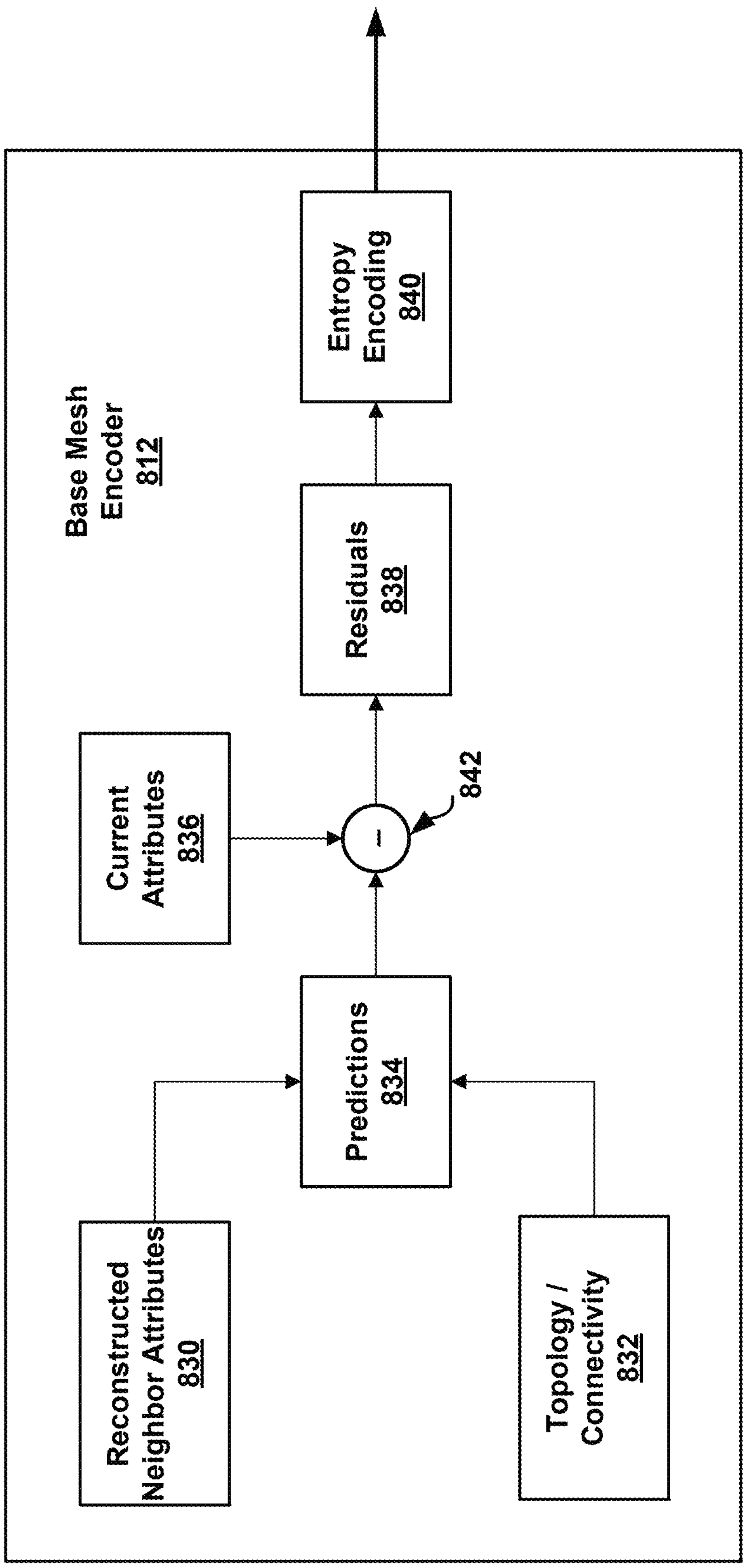
FIGS. 8A-16B show example implementations of base mesh encoders and base mesh decoders.

The attribute encoding procedure in the base mesh encoder is shown in FIG. 8A and includes:

- Topology/Connectivity: The topology in the base mesh is encoded through the edgebreaker using the CLERS op code. This contains not just the connectivity information but also the data structure for the mesh (current implementation employs corner table). The topology/connectivity information is employed to find the neighboring vertices.
- Attributes: These include Geometry (3D coordinates), UV Coordinates (Texture), Normals, RGB values, etc.
- Neighboring attributes: These are the attributes of the neighboring vertices that are employed to predict the current vertex's attribute.
- Current Attributes: This is the attribute of the current vertex. The predicted attribute is subtracted from the current vertex attribute to obtain the residuals.
- Predictions. These predictions may be obtained from the connectivity and/or from the previously visited/encoded/decoded vertices. E.g., multi-parallelogram process for geometry, min stretch scheme for UV coordinates, etc.
- Residuals. These are obtained by subtracting the predictions from original attributes. (e.g., residuals=current_vertex_attribute−predicted_attribute)
- Entropy Encoding. Finally, the Residuals are entropy encoded to obtain the bitstream.

Figure 8B:
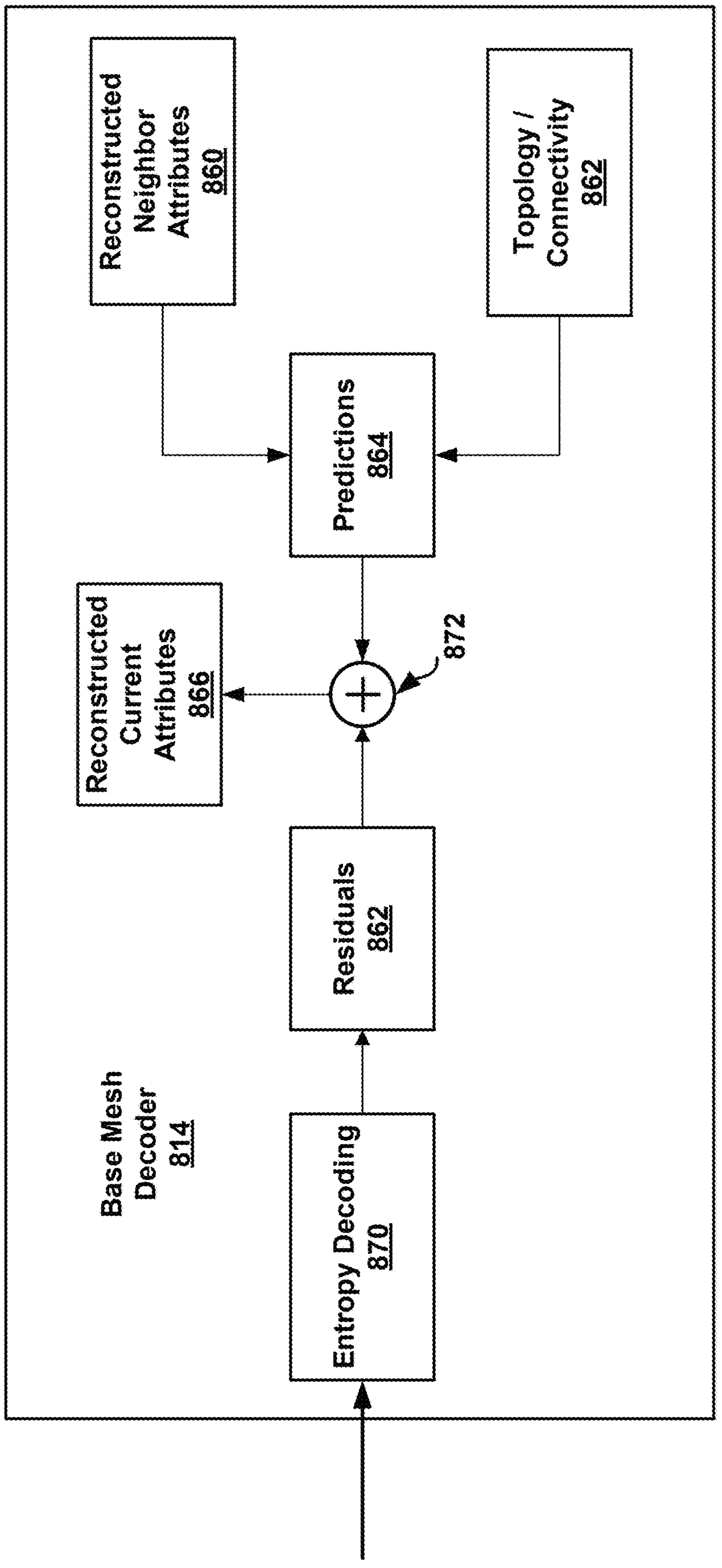

FIGS. 8A and 8B show an encoder and decoder architecture for base mesh encoding/decoding (also referred to as static mesh encoding/decoding). FIG. 8A shows base mesh encoder 812, which represents an example implementation of base mesh encoder 212 in FIG. 2, and FIG. 8B shows base mesh decoder 814, which represents an example implementation of base mesh decoder 314 in FIG. 3.

In the example of FIG. 8A, base mesh encoder 812 determines reconstructed neighbor attributes 830 and topology/connectivity information 832 to determine predictions 834. Base mesh encoder 812 subtracts (842) predictions 834 from current attributes 836 to determine residuals 838. Reconstructed neighbor attributes 830 represent the decoded values of already encoded vertex attributes, and current attributes 836 represent the actual values of unencoded vertex attributes. Thus, residuals 838 represent the differences between actual values of unencoded vertex attributes and predicted values for those vertex attributes. Base mesh encoder 812 may entropy encode (840) residuals 838.

In the example of FIG. 8B, base mesh decoder 814 determines reconstructed neighbor attributes 860 and topology/connectivity information 862 to determine predictions 864 in the same manner that base mesh encoder 812 determines predictions 834. Base mesh decoder 814 entropy decodes (870) the entropy encoded residual values to determine residuals 868. Base mesh decoder 814 adds (872) predictions 864 to residuals 868 to determine reconstructed current attributes 866. Reconstructed current attributes 866 represent the decoded versions of current attributes 836.

The base mesh encoder is an integral part of the V-DMC structure. Lossless encoding in V-DMC relies heavily on the base mesh encoder while in the lossless encoder the quality of the base mesh encoding greatly effects the final reconstructed mesh. Base mesh encoder also forms a significant portion of the V-DMC's overall bitstream. Therefore, there may be a need to further decrease the bitstream size of the base mesh encoder. The attribute bitstream envelops large amount of the base mesh encoded bitstream. The attribute bitstream contains the residual attribute values. The entropy of these residuals may still be large, and there may still be correlation between neighboring vertices' residuals. The techniques of this disclosure may decrease the size of the attribute bitstream and further decrease the entropy of the attributes and/or the residuals that are to be encoded for the base mesh.

This disclosure describes techniques for applying a transform and/or quantization to the attributes, predictions, and/or the residuals during base mesh coding and applying, during decoding, an inverse quantization (also called dequantization), if applicable, and inverse transform, if applicable, in the corresponding data to obtain the reconstructed residuals/predictions/attributes.

FIGS. 8A and 8B above show attribute encoding in base mesh encoders and decoders. FIGS. 9A-16B represent modifications to FIGS. 8A and 8B to implement transforms and/or quantization. FIGS. 9A-11B show encoders/decoders that implement lossless transforms/inverse transforms. FIGS. 12A-16B show lossy cases. These show the possible locations for transform, quantization, inverse-transform, and dequantization for attribute encoding in base mesh encoder and decoder.

These transforms may be applied at multiple locations during the encoding and decoding process. Some of these locations are shown in FIGS. 9A-16B. FIGS. 9A-11B show examples for lossless cases, while FIGS. 12A-16B show examples for lossy cases. The difference in lossy and lossless case is that in the lossy case, there is a need to perform inverse transform and a dequantization at the encoder to create the same reconstructed current attributes that are used to update the reconstructed neighboring attributes. Furthermore, in the lossy case, a quantization/dequantization step may be employed.

Figure 9A:
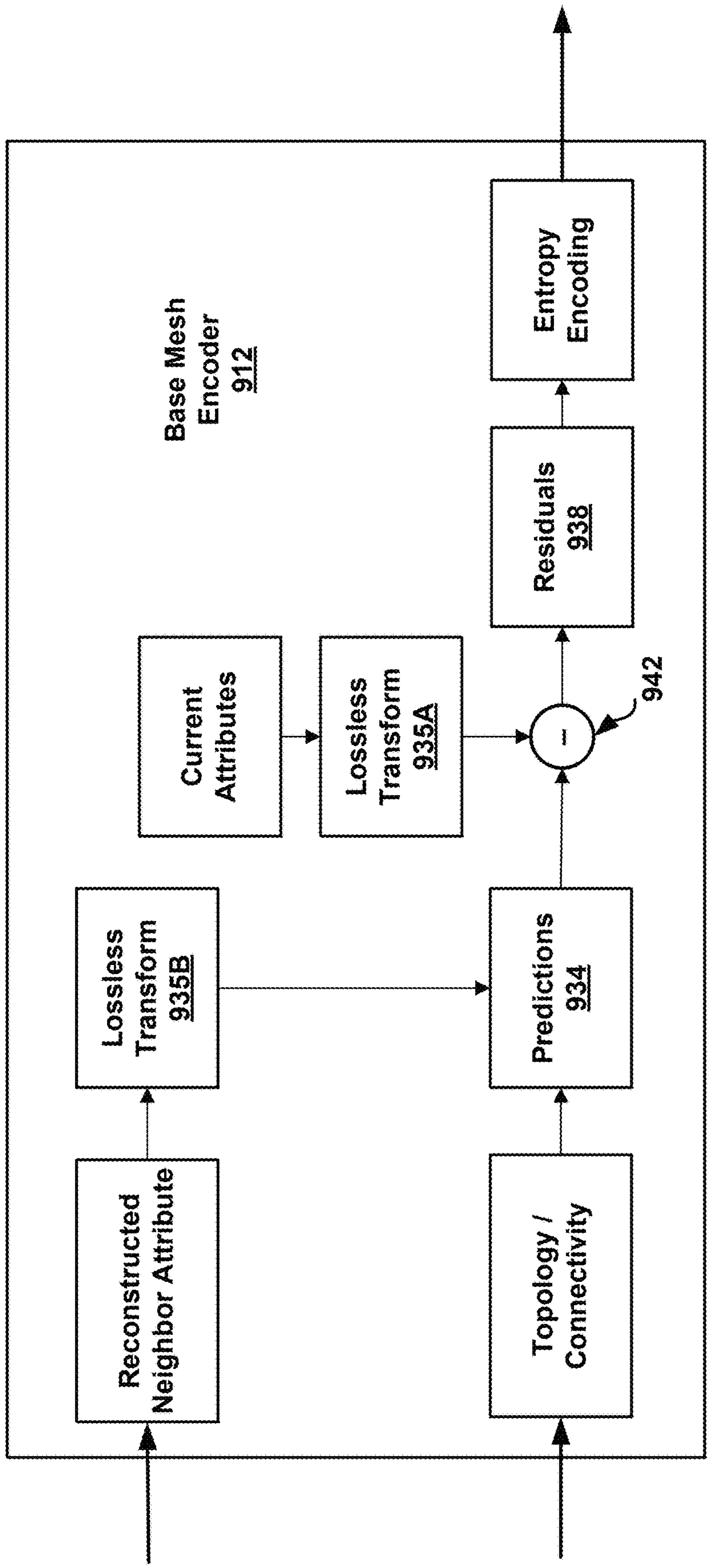
Figure 9B:
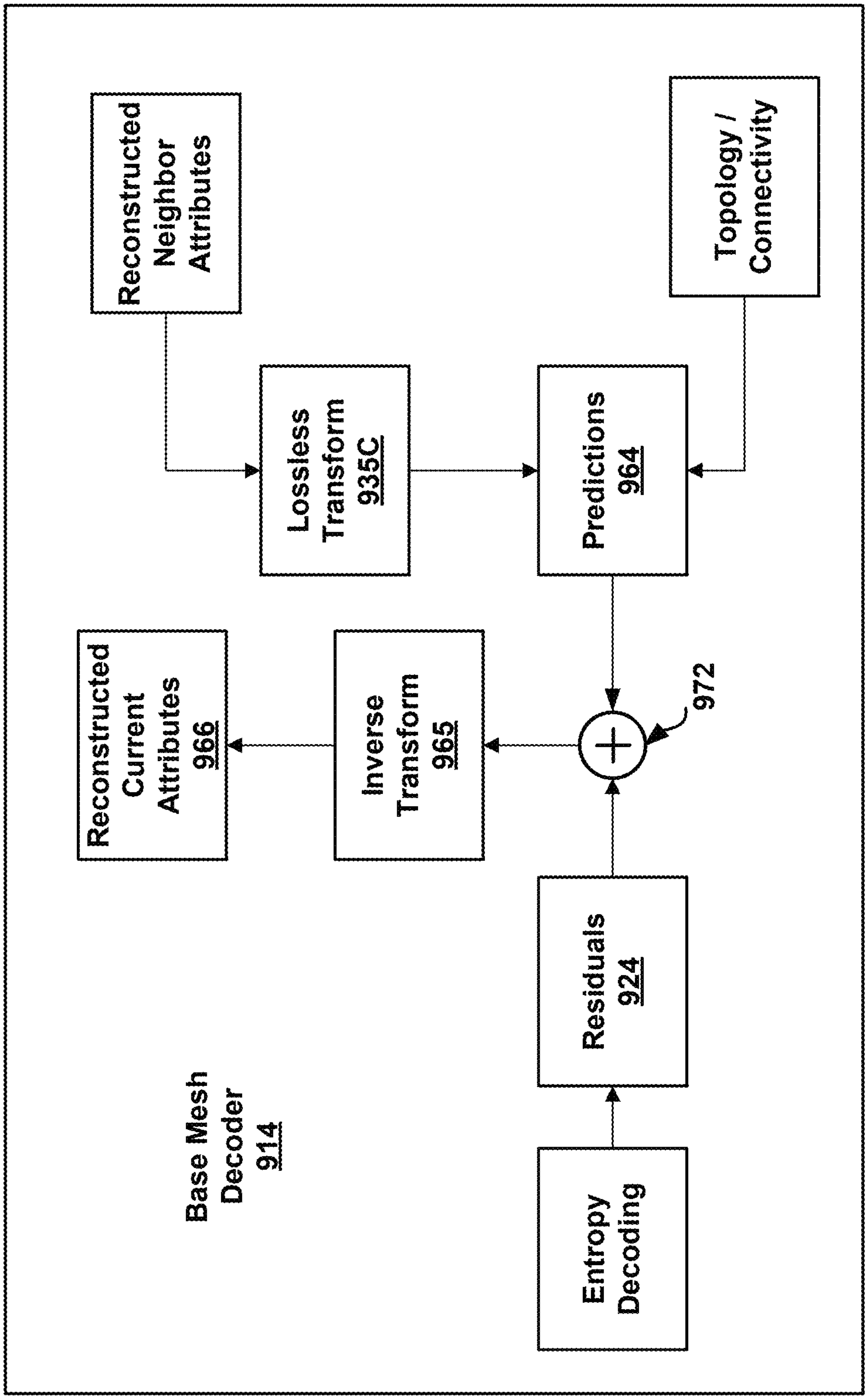

FIG. 9A shows base mesh encoder 912, which represents an example implementation of base mesh encoder 212 in FIG. 2, and FIG. 9B shows base mesh decoder 914, which represents an example implementation of base mesh decoder 314 in FIG. 3. FIGS. 9A and 9B show a lossless case where the transform is applied to the attributes and the predictions are in the transform domain.

In the example of FIG. 9A, lossless transform 935A is applied to current attributes, and the same lossless transform 935B is applied to reconstructed neighbor attributes. Predictions 934 are then determined in the transform domain. Thus, when the transform-domain prediction values are subtracted (942) from the transformed current attributes, the resulting residual values (938) are in the transform domain.

In the example of FIG. 9B, lossless transform 935C, which is the same transform as lossless transform 935A and 935B, is performed on reconstructed neighbor attributes values and prediction values (964) are determined from the transformed reconstructed neighbor attribute values. The transform-domain prediction values (964) are then added (972) to the transform-domain residuals (962) to determine transform-domain reconstructed attribute values. Inverse transform 965, which is the inverse transform of lossless transforms 935A, 935B, and 935C, is performed on the transform-domain reconstructed attribute values to determine reconstructed current attribute values 966.

Figure 10A:
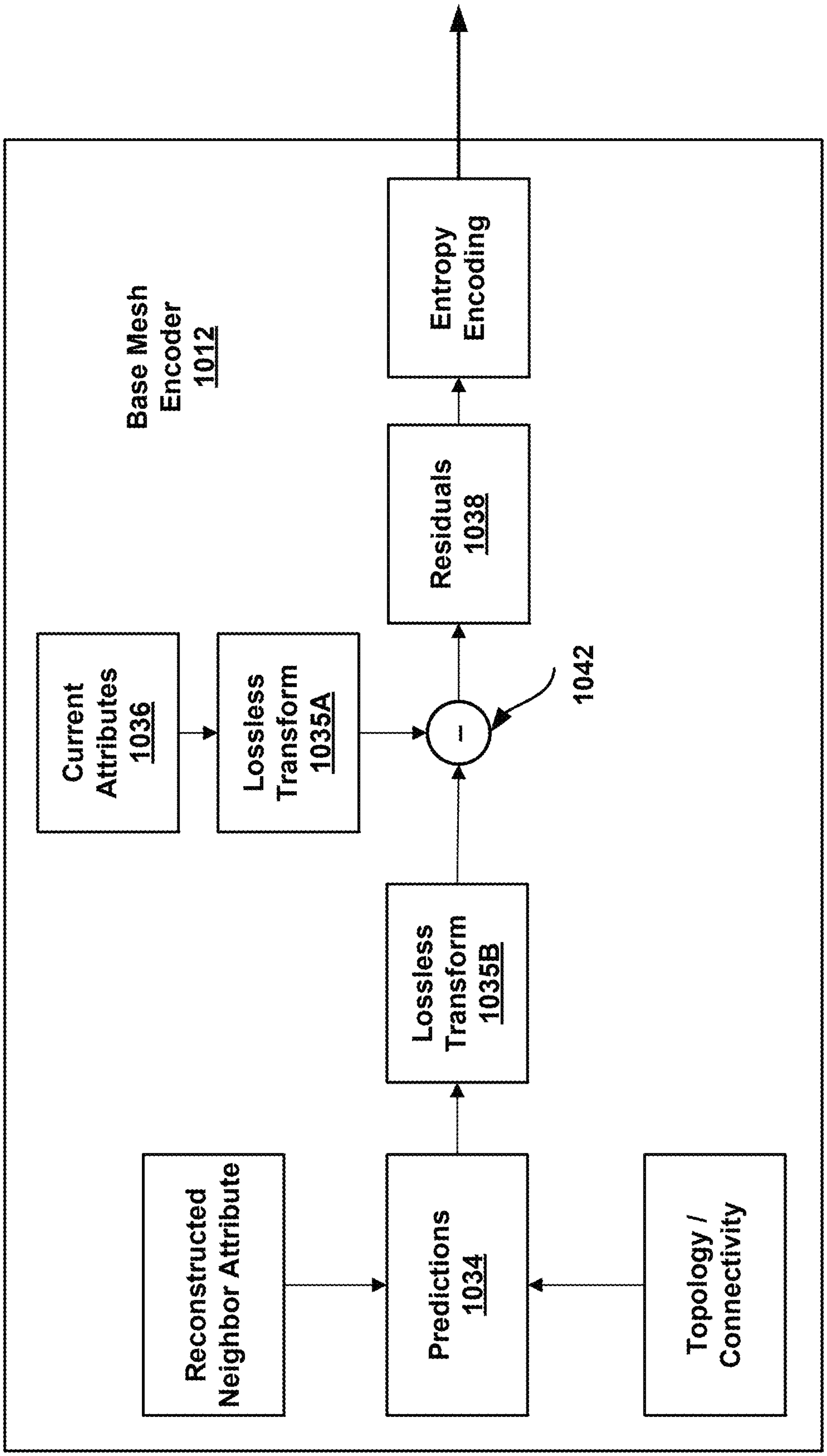
Figure 10B:
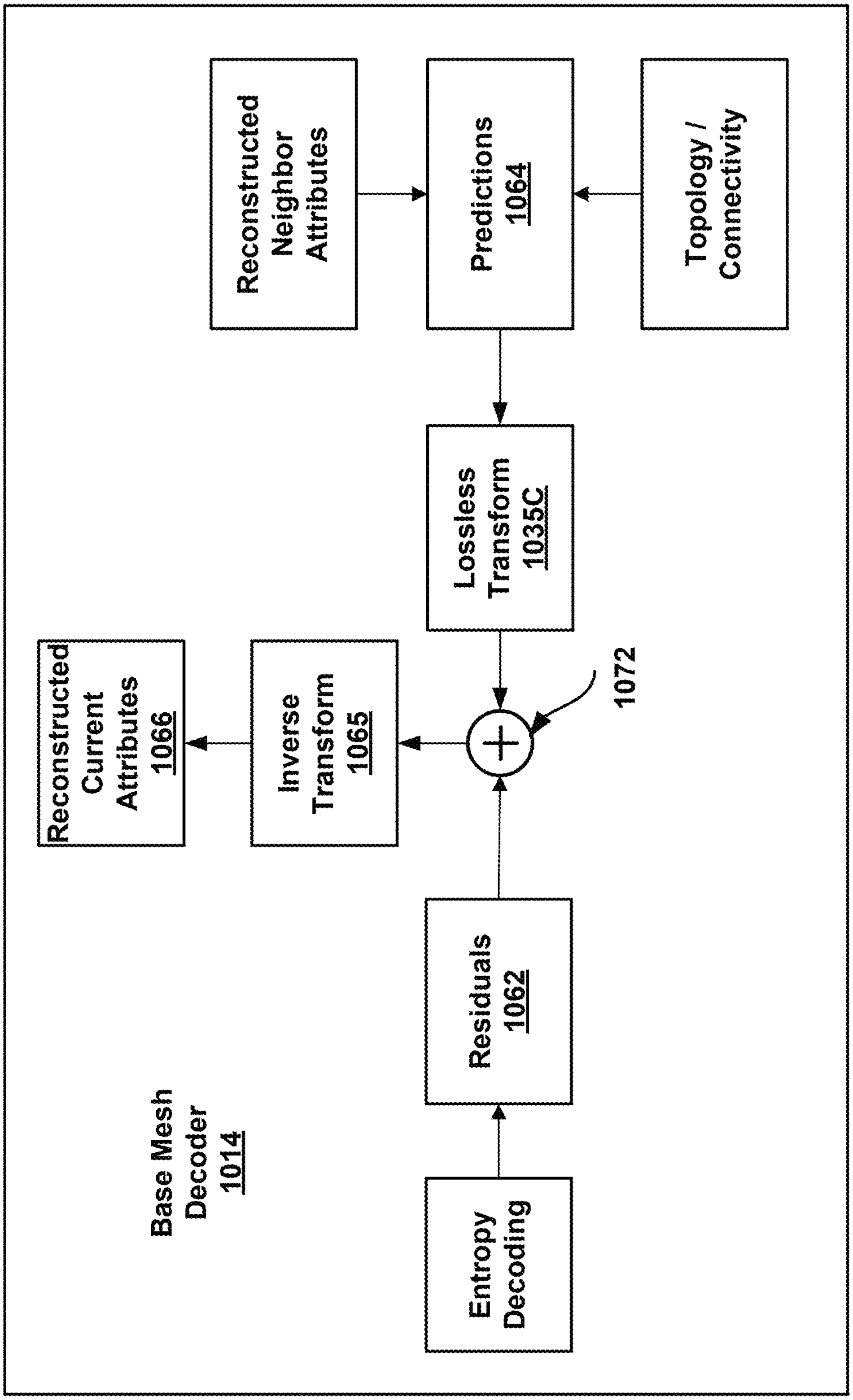

FIG. 10A shows base mesh encoder 1012, which represents an example implementation of base mesh encoder 212 in FIG. 2, and FIG. 10B shows base mesh decoder 1014, which represents an example implementation of base mesh decoder 314 in FIG. 3. FIGS. 10A and 10B shows a lossless case where the transform is applied to the predictions and the current attributes. The residuals are calculated in the transform domain.

In the example of FIG. 10A, lossless transform 1035A is applied to current attributes 1036, and the same lossless transform 1035B is applied to predictions 1034. Thus, when the transformed prediction values are subtracted (1042) from the transformed current attribute values, the resulting residual values (1038) are in the transform domain.

In the example of FIG. 10B, lossless transform 1035C, which is the same transform as lossless transform 1035A and 1035B, is performed on prediction values 1064. The transformed prediction values are then added (1072) to the transform-domain residuals (1062) to determine transform-domain reconstructed attribute values. Inverse transform 1065, which is the inverse transform of lossless transforms 1035A, 1035B, and 1035C, is performed on the transform-domain reconstructed attribute values to determine reconstructed attribute values 1066.

Figure 11A:
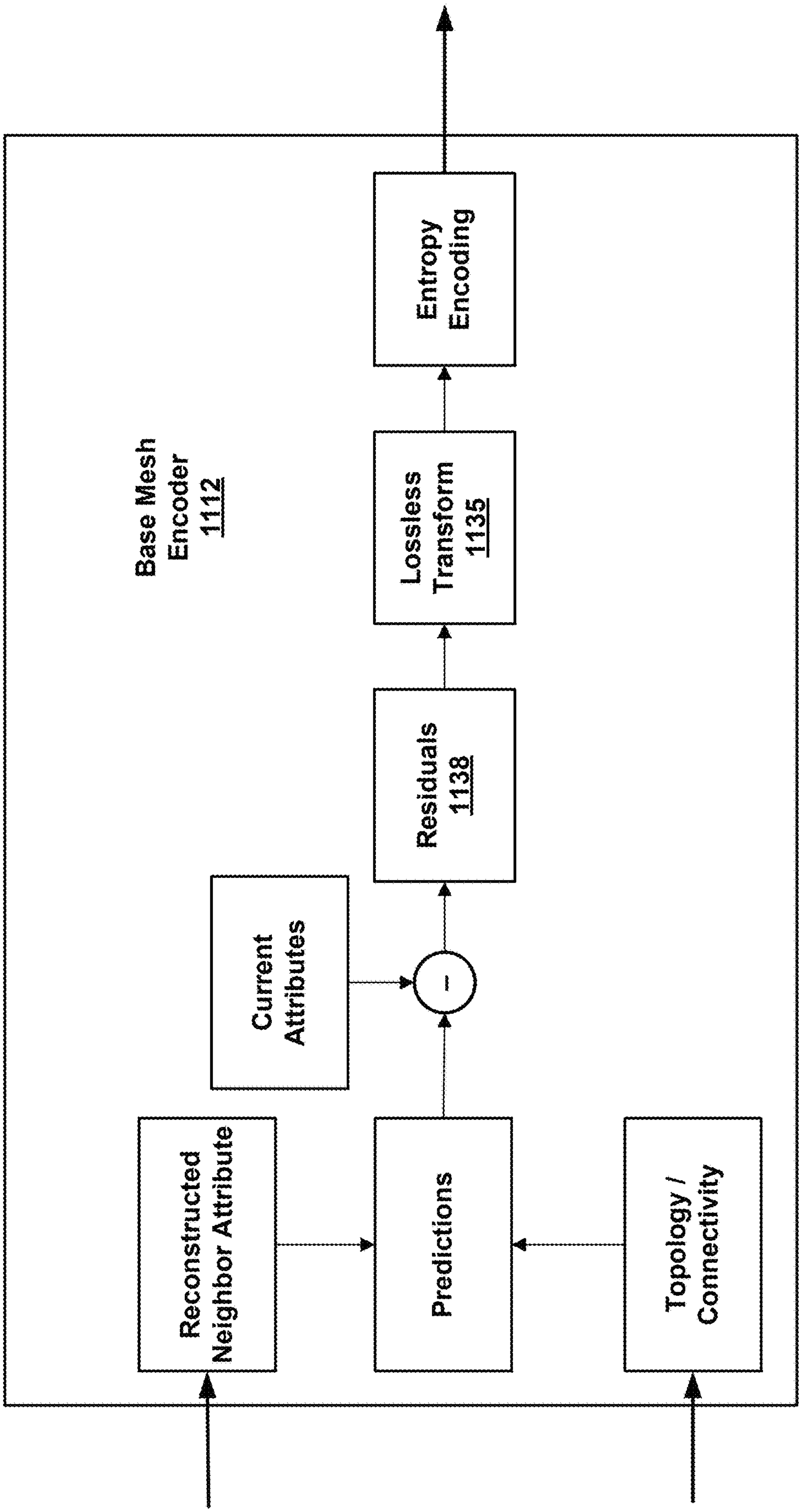
Figure 11B:
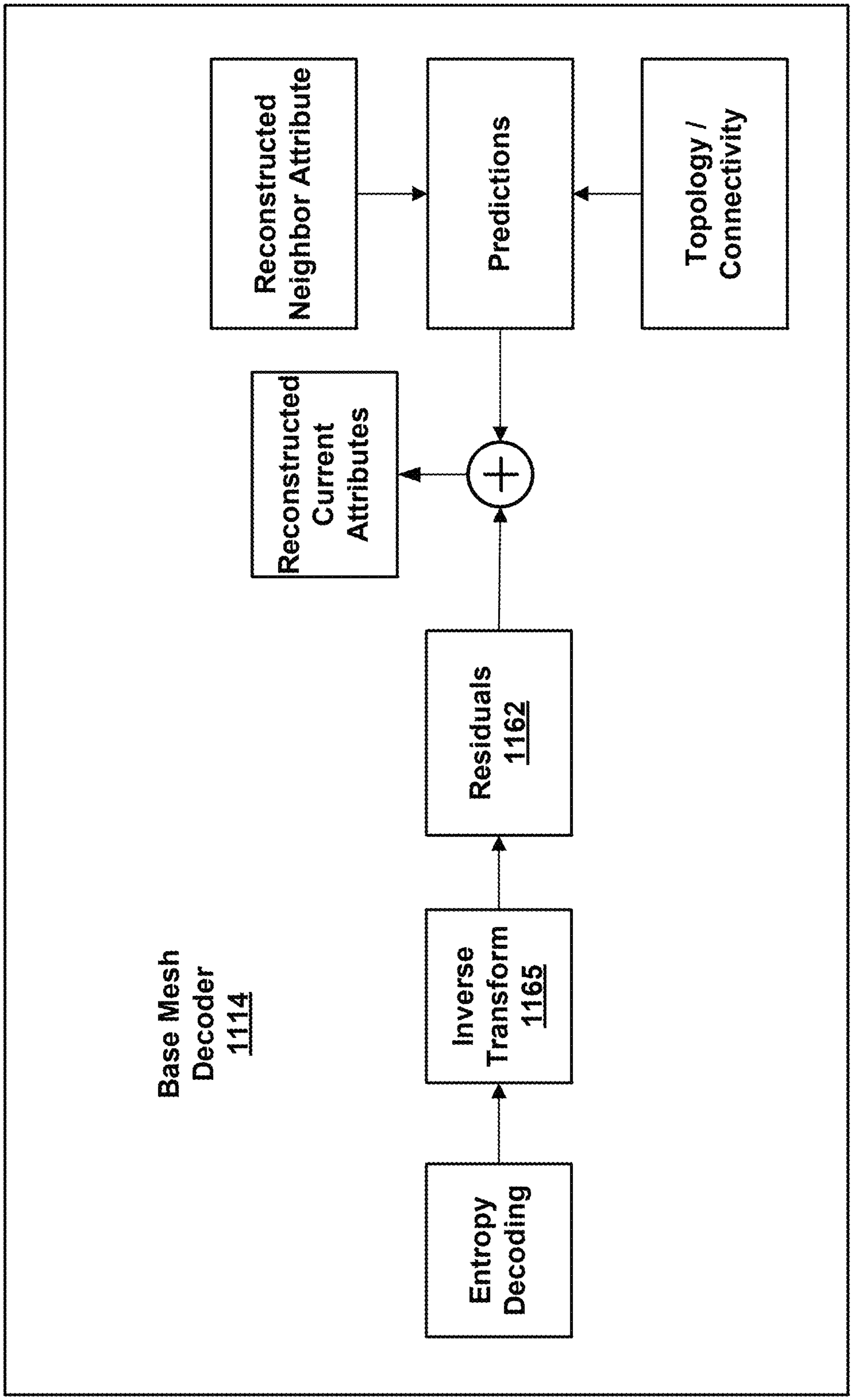

FIG. 11A shows base mesh encoder 1112, which represents an example implementation of base mesh encoder 212 in FIG. 2, and FIG. 11B shows base mesh decoder 1114, which represents an example implementation of base mesh decoder 314 in FIG. 3. FIGS. 11A and 11B shows the lossless case where the transform is applied to the residuals. The encoded data here is in transform domain, and everything else is not in the transform domain.

In the example of FIG. 11A, lossless transform 1135 is applied to residuals 1138 to determined transformed residual data, and in the example of FIG. 11B, lossless inverse transform 1165 is applied to the transformed residual data to determine residual values 1162.

Figure 12A:
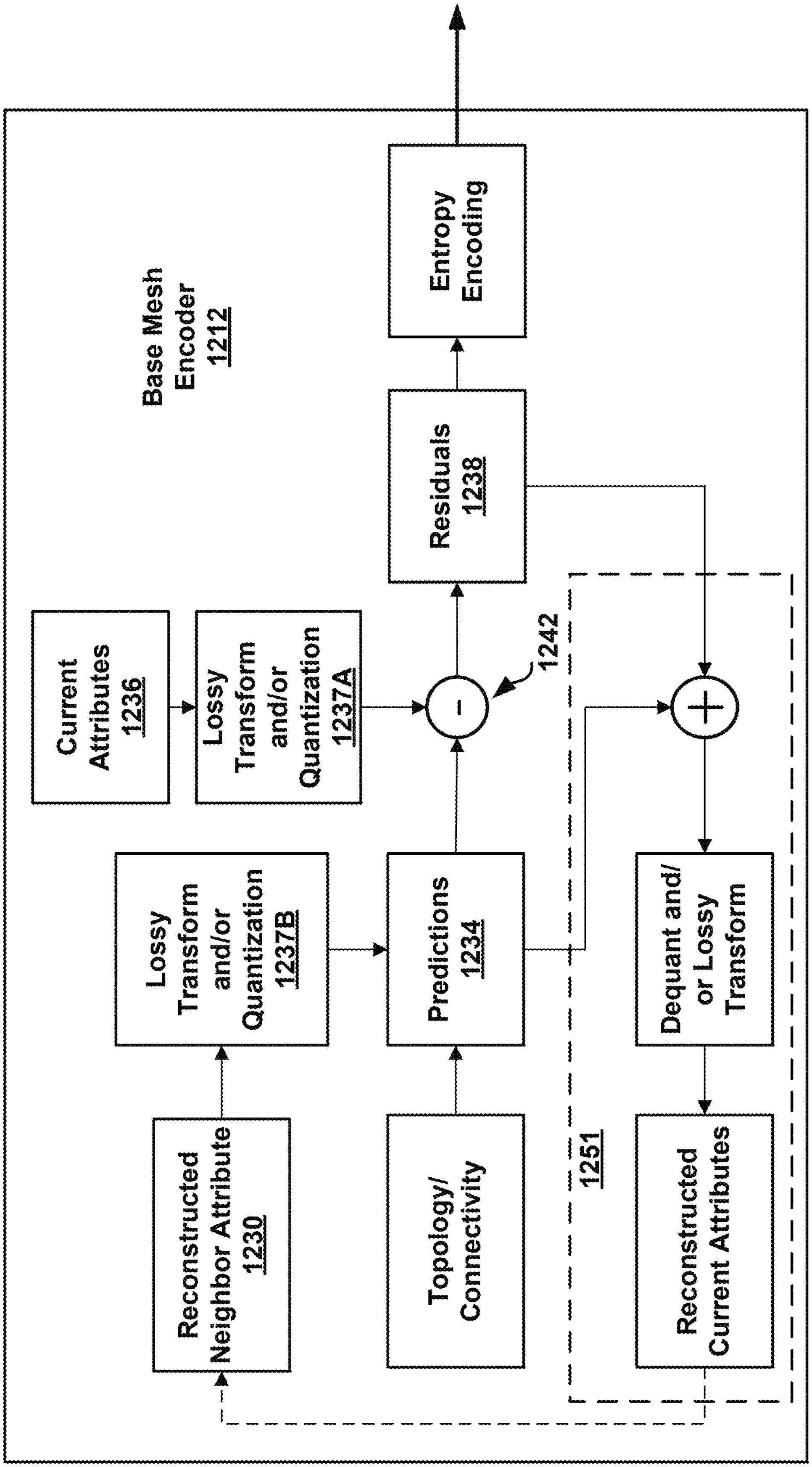
Figure 12B:
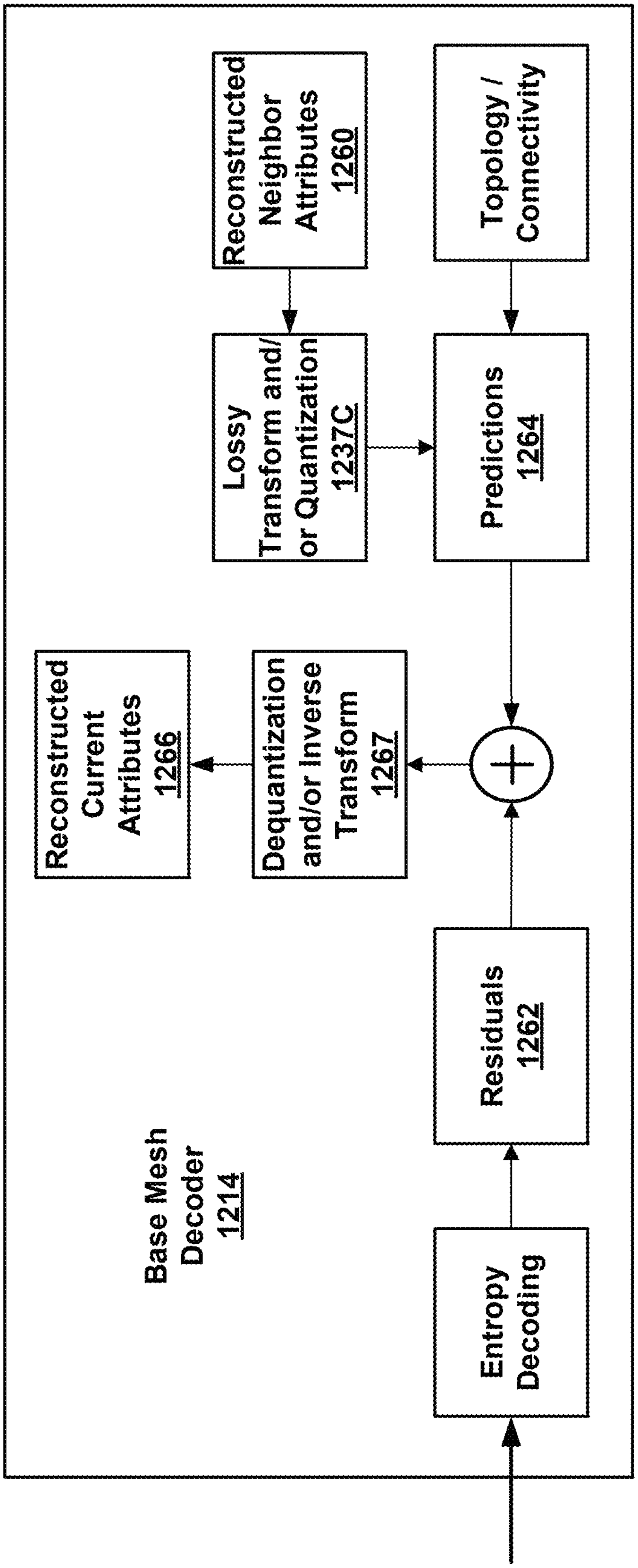

FIG. 12A shows base mesh encoder 1212, which represents an example implementation of base mesh encoder 212 in FIG. 2, and FIG. 12B shows base mesh decoder 1214, which represents an example implementation of base mesh decoder 314 in FIG. 3. FIGS. 12A and 12B show a lossy case where the transform and/or the quantization is applied to the attributes. In the lossy case the inverse transform and/or dequantization is also applied in the encoder to update the reconstructed neighboring attributes in each iteration.

In the example of FIG. 12A, base mesh encoder 1215 applies lossy transform and/or quantization 1237A to current attributes 1236, and the same lossless transform 1237B is applied to reconstructed neighbor attributes 1230. Prediction values 1234 are then determined in the transform domain. Thus, when the transform-domain prediction values 1234 are subtracted (1242) from the transformed current attributes, the resulting residual values (1238) are in the transform domain. Due to lossy transform and/or quantization 1237A introducing loss, base mesh encoder 1212 is configured to determine residual values 1238 using decoded (e.g., with the loss) reconstructed neighbor attribute values instead of original neighboring attribute values. Thus, base mesh encoder 1212 includes a decoding loop 1251 that is configured to perform the same decoding, e.g. the same lossy transform and/or quantization, that will be performed by base mesh decoder 1214.

In the example of FIG. 12B, base mesh decoder 1214 applies lossy transform and/or quantization 1237C to reconstructed neighbor attributes (1260) in order to determine prediction values 1264 in a transformed and/or quantized domain. The transformed and/or quantized prediction values 1264 are then added (1272) to the transformed and/or quantized domain residuals (1262) to determine transformed and/or quantized domain reconstructed attribute values. Inverse transform and/or dequantization 1567, which is the inverse transform and/or dequantization 1237C, is performed on the transform and/or quantized domain reconstructed attribute values to determine reconstructed attribute values 1266.

Figure 13A:
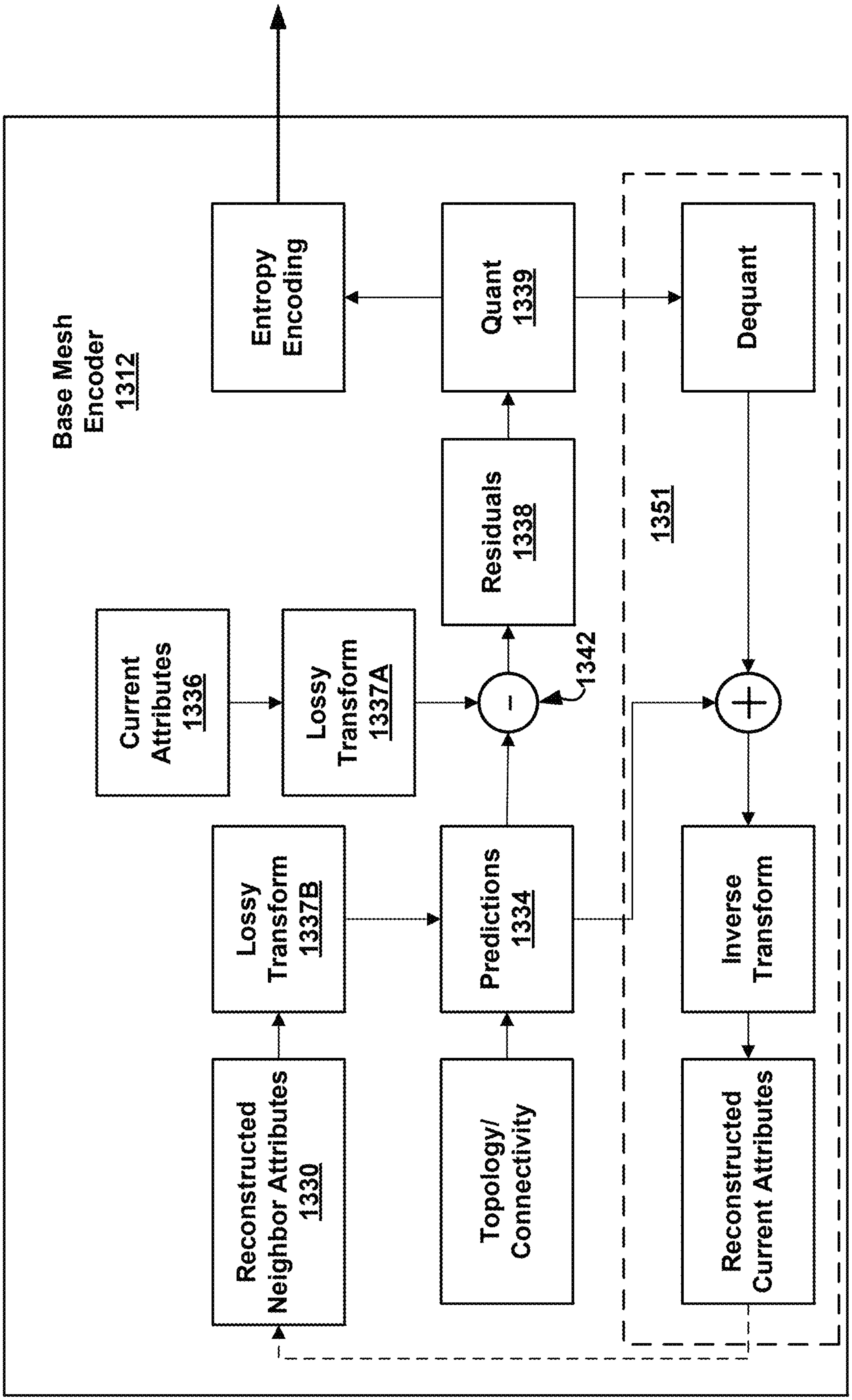
Figure 13B:
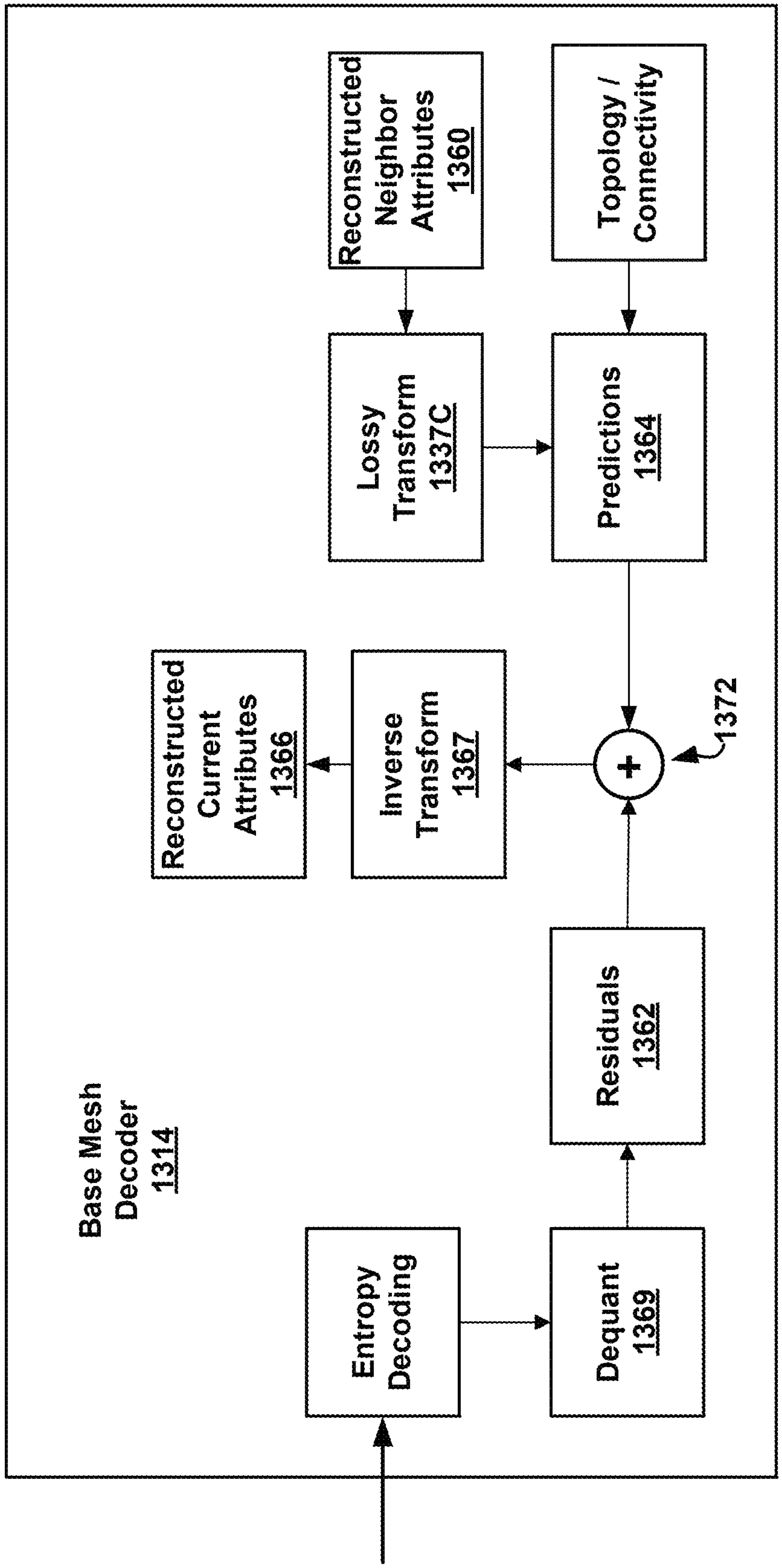

FIG. 13A shows base mesh encoder 1312, which represents an example implementation of base mesh encoder 212 in FIG. 2, and FIG. 13B shows base mesh decoder 1314, which represents an example implementation of base mesh decoder 314 in FIG. 3. FIGS. 13A and 13B are similar to FIGS. 12A and 12B but the quantization is separated from the transform.

In the example of FIG. 13A, base mesh encoder 1315 applies lossy transform 1337A to current attributes 1336, and the same lossless transform 1337B to reconstructed neighbor attributes 1330. Prediction values 1334 are then determined in the transform domain. Thus, when the transform-domain prediction values 1334 are subtracted (1342) from the transformed current attributes, the resulting residual values (1338) are in the transform domain. Base mesh encoder 1315 then quantizes (1339) the transform-domain residual values. Due to lossy transform 1337 and quantization 1339 introducing loss, base mesh encoder 1312 is configured to determine residual values 1338 using decoded (e.g., with the loss) reconstructed neighbor attribute values instead of original neighboring attribute values. Thus, base mesh encoder 1312 includes a decoding loop 1351 that is configured to perform the same decoding, e.g. the same lossy transform and quantization, that will be performed by base mesh decoder 1314.

In the example of FIG. 13B, base mesh decoder 1314 applies lossy transform 1337C to reconstructed neighbor attributes 1360 in order to determine prediction values 1364 in a transform domain. Base mesh decoder 1314 dequantizes the quantized transform-domain residuals to determine dequantized, transform-domain residuals 1362. The transform-domain prediction values 1364 are then added (1372) to the transform-domain residuals (1362) to determine transform domain reconstructed attribute values. Inverse transform 1367, which is the inverse transform and/or dequantization 1337, is performed on the transform domain reconstructed attribute values to determine reconstructed attribute values 1366.

Figure 14A:
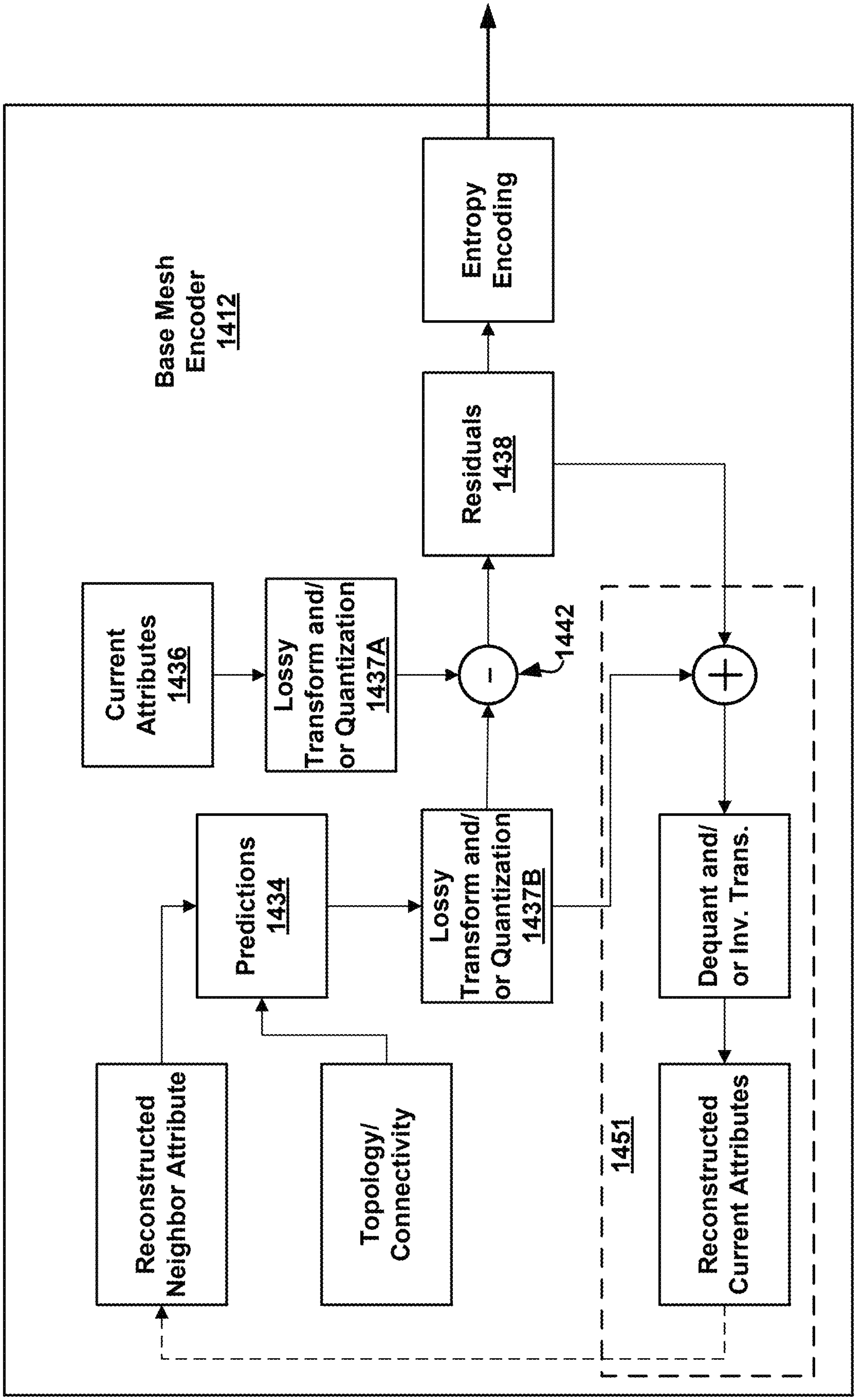
Figure 14B:
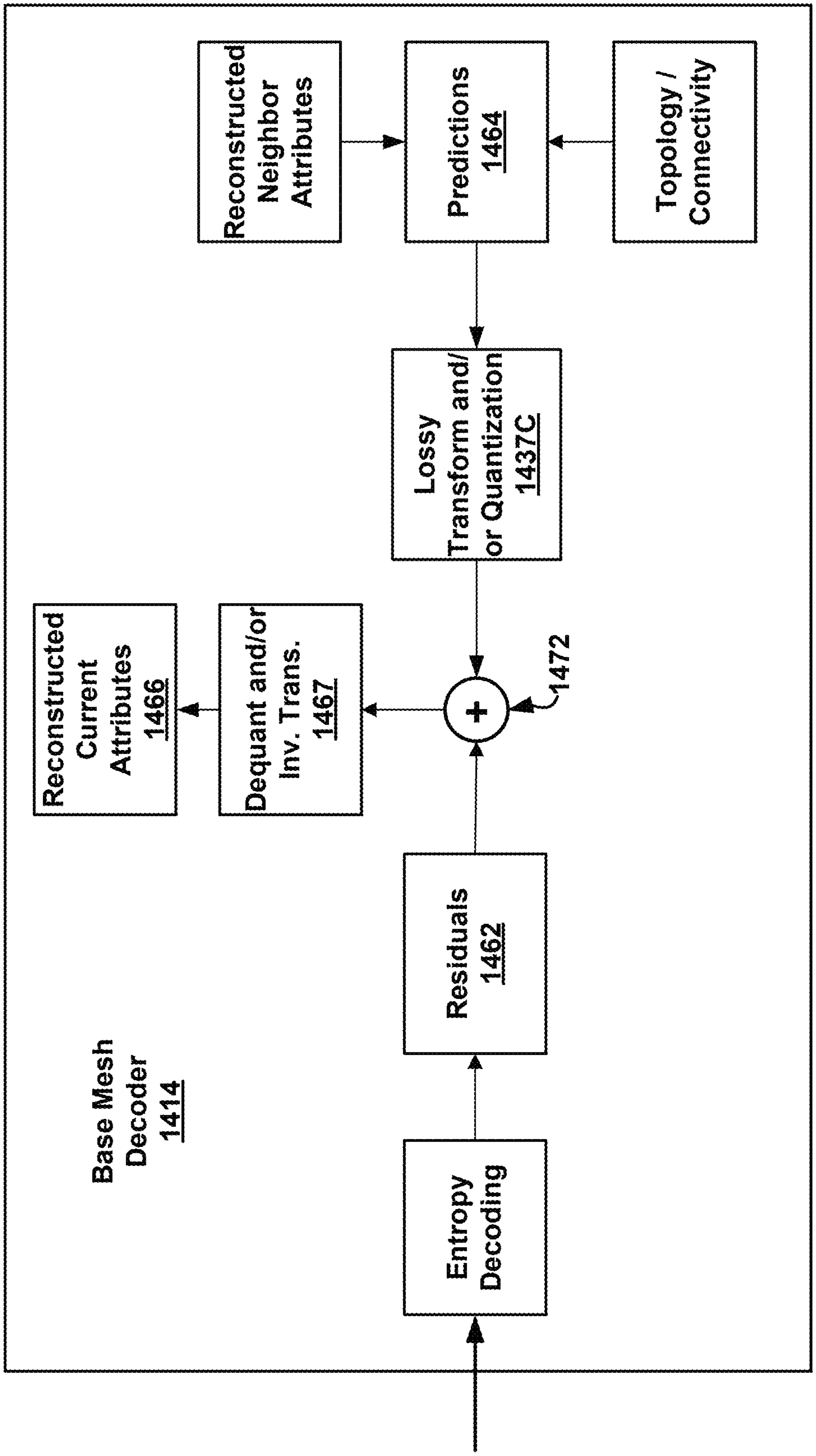

FIG. 14A shows base mesh encoder 1412, which represents an example implementation of base mesh encoder 212 in FIG. 2, and FIG. 14B shows base mesh decoder 1414, which represents an example implementation of base mesh decoder 314 in FIG. 3. FIGS. 14A and 14B shows the lossy case where the transform and/or dequantization is applied to the predictions and the current attributes. In the lossy case the inverse transform and/or dequantization is also applied in the encoder to update the reconstructed neighboring attributes in each iteration.

In the example of FIG. 14A, base mesh encoder 1415 applies lossy transform and/or quantization 1437A to current attributes 1436, and the same lossless transform 1437B is applied to prediction values 1434. The transformed and/or quantized prediction values 1434 are subtracted (1442) from the transformed and/or quantized current attributes to determine transformed and/or quantized residual values 1438. Due to lossy transform and/or quantization 1437A introducing loss, base mesh encoder 1412 is configured to determine residual values 1438 using decoded (e.g., with the loss) reconstructed neighbor attribute values instead of original neighboring attribute values. Thus, base mesh encoder 1412 includes a decoding loop 1451 that is configured to perform the same decoding, e.g. the same lossy transform and/or quantization, that will be performed by base mesh decoder 1414.

In the example of FIG. 14B, base mesh decoder 1414 applies lossy transform and/or quantization 1437C to predictions 1464. The transformed and/or quantized prediction values are then added (1472) to the transformed and/or quantized domain residuals (1462) to determine transformed and/or quantized domain reconstructed attribute values. Inverse transform and/or dequantization 1467, which is the inverse transform and/or dequantization 1437C, is performed on the transform and/or quantized domain reconstructed attribute values to determine reconstructed attribute values 1466.

Figure 15A:
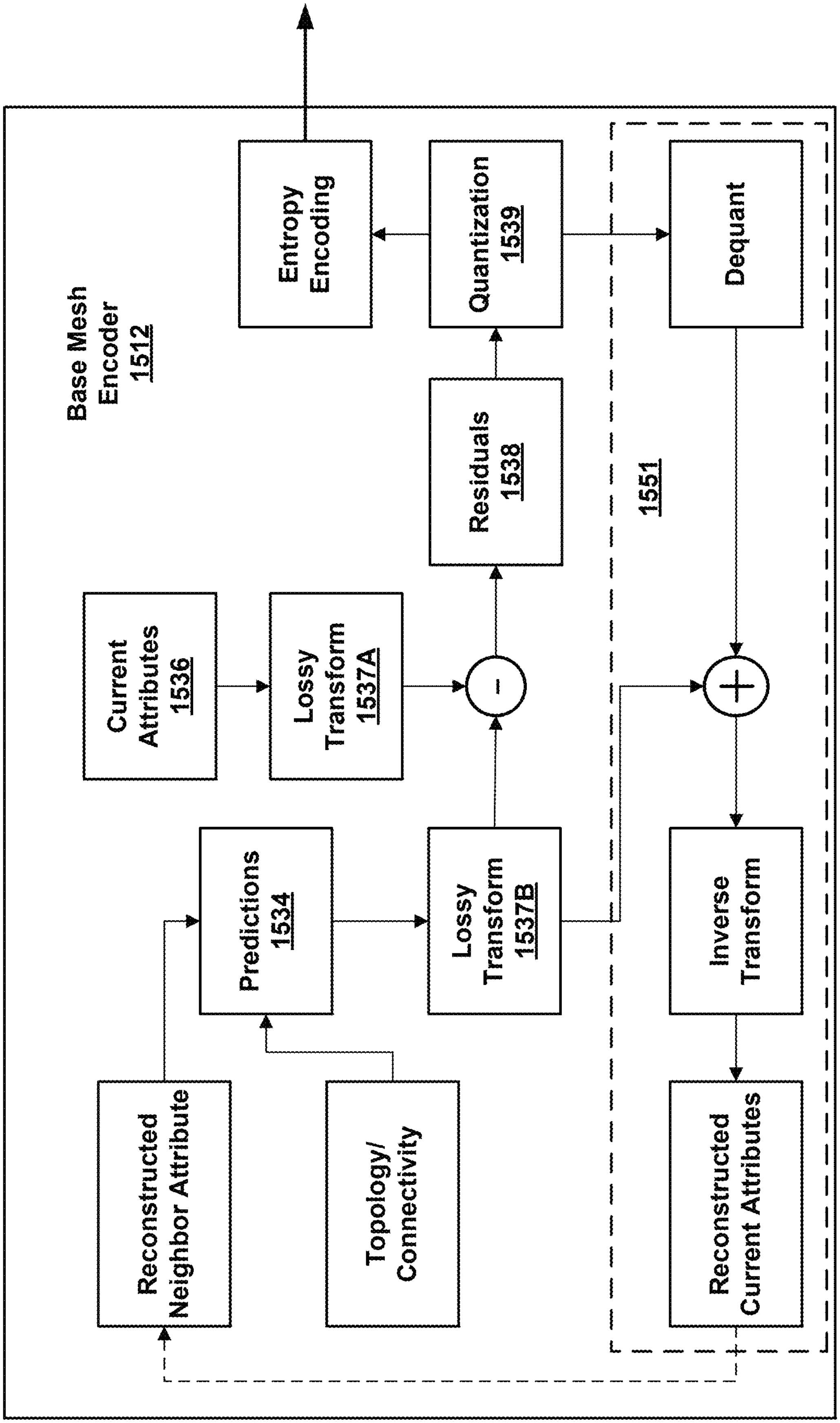
Figure 15B:
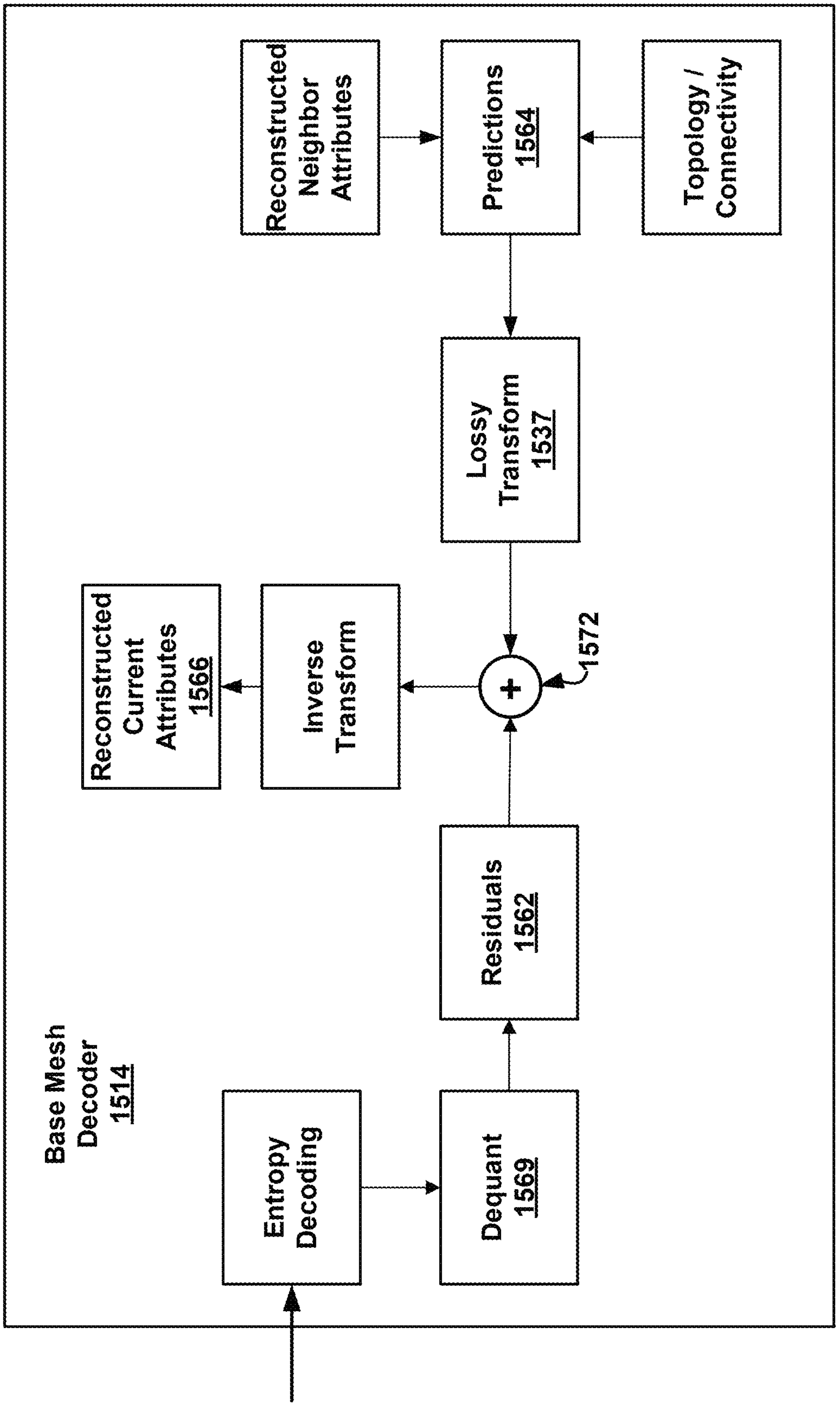

FIG. 15A shows base mesh encoder 1512, which represents an example implementation of base mesh encoder 212 in FIG. 2, and FIG. 15B shows base mesh decoder 1514, which represents an example implementation of base mesh decoder 314 in FIG. 3. FIGS. 15A and 15B are similar to FIGS. 14A and 14B but the quantization is separated from the transform.

In the example of FIG. 15A, base mesh encoder 1515 applies lossy transform 1537A to current attributes 1536, and the same lossless transform 1537B to predictions 1634. Thus, when the transform domain prediction values are subtracted (1542) from the transformed current attributes, the resulting residual values (1538) are in the transform domain. Base mesh encoder 1515 then quantizes (1539) the transform domain residual values. Due to lossy transform 1537 and quantization 1539 introducing loss, base mesh encoder 1512 is configured to determine residual values 1538 using decoded (e.g., with the loss) reconstructed neighbor attribute values instead of original neighboring attribute values. Thus, base mesh encoder 1512 includes a decoding loop 1551 that is configured to perform the same decoding, e.g. the same lossy transform and quantization, that will be performed by base mesh decoder 1514.

In the example of FIG. 15B, base mesh decoder 1514 applies lossy transform 1537C to predictions 1564. Base mesh decoder 1514 dequantizes (1569) the quantized transform domain residuals to determine dequantized, transform domain residuals 1562. The transform domain prediction values are then added (1572) to the transform domain residuals (1562) to determine transform domain reconstructed attribute values. Inverse transform 1567, which is the inverse transform and/or dequantization 1537, is performed on the transform domain reconstructed attribute values to determine reconstructed attribute values 1566.

Figure 16A:
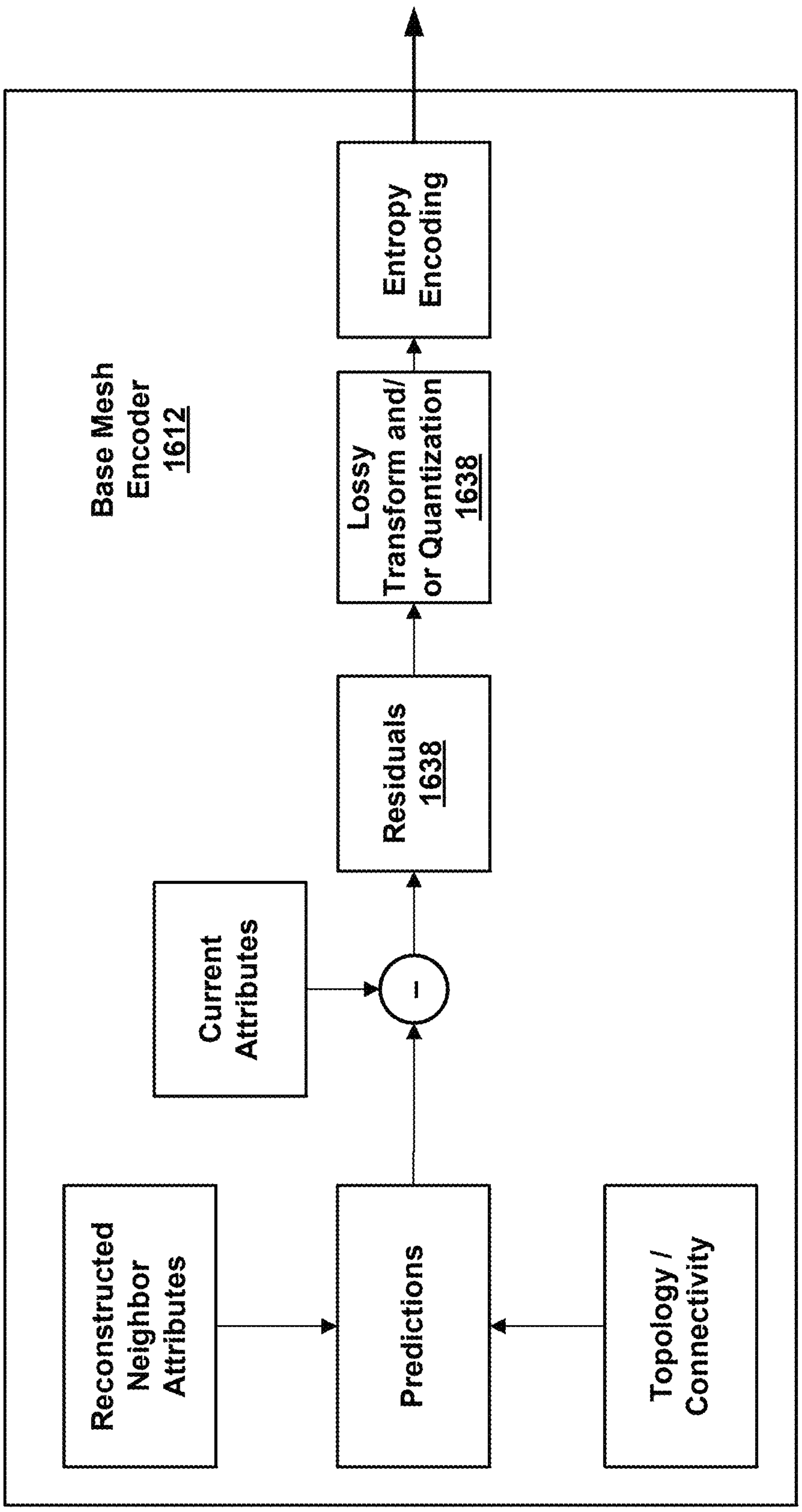
Figure 16B:
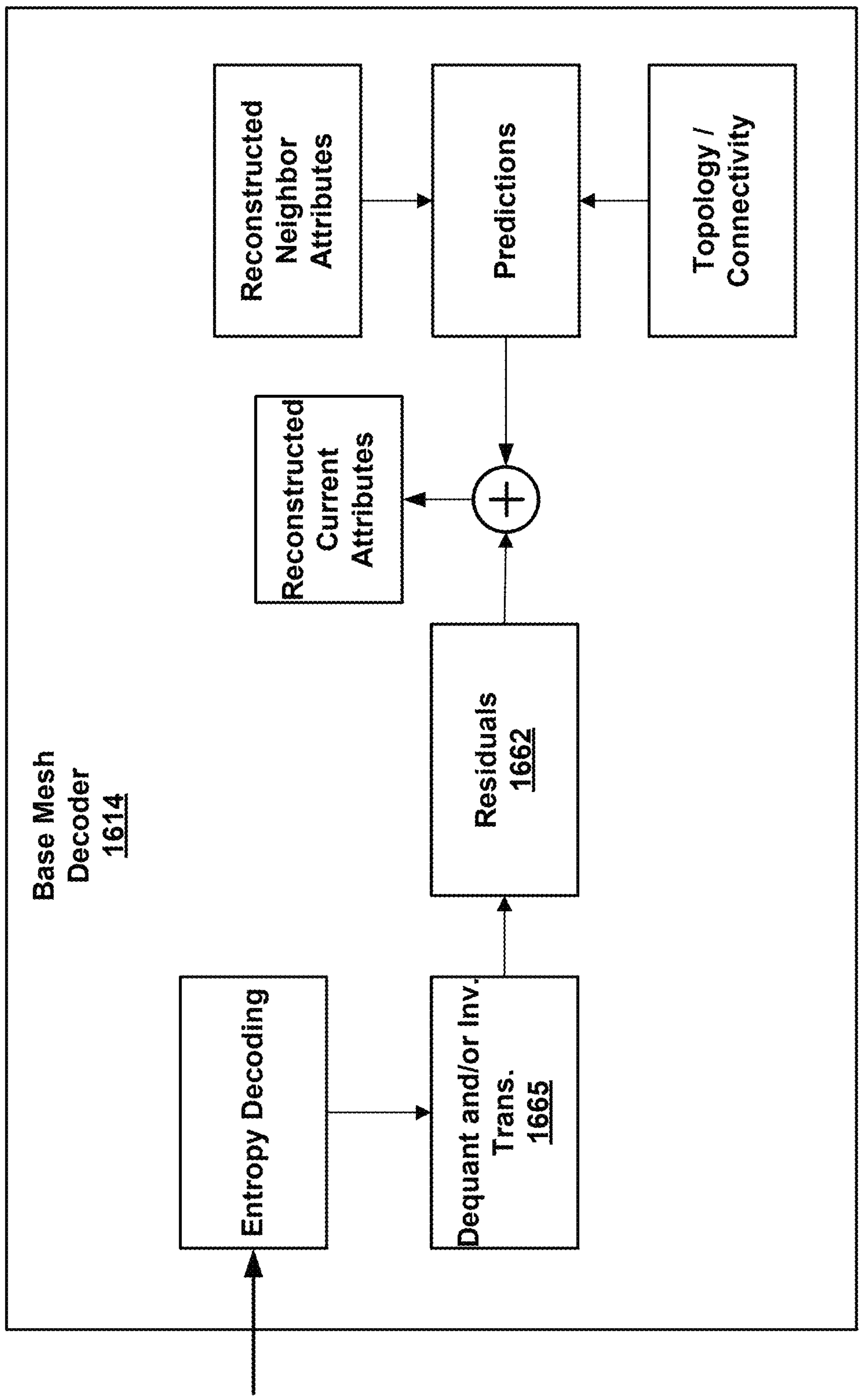

FIG. 16A shows base mesh encoder 1612, which represents an example implementation of base mesh encoder 212 in FIG. 2, and FIG. 16B shows base mesh decoder 1614, which represents an example implementation of base mesh decoder 314 in FIG. 3. FIGS. 16A and 16B shows the lossy case where the transform and/or dequantization is applied to the residuals.

In the example of FIG. 16A, lossy transform and/or quantization 1635 is applied to residuals 1638 to determined transformed and/or quantized residual data, and in the example of FIG. 11B, lossy inverse transform and/or dequantization 1665 is applied to the transformed residual data to determine residual values 1662.

There are other possible combinations and locations for transform and quantization. It is also possible to not have a transform at all and just use quantization in the framework. Typically, the transform may be applied before the quantization step in the encoder. While the dequantization is applied before the inverse transform.

The goal is to decrease the entropy of the data that is encoded for the attribute encoding using an entropy encoder. A decrease in entropy would result in a smaller bitstream and a better compression of attributes.

The encoders and decoders described in FIGS. 12A-FIG. 16B may implement any variety of transforms. The properties of a transform that may be suitable:

- Transforms that can decorrelate the data.
- Transforms that can partition signal energy such as to decrease the entropy and help compress data further.
- Transforms that have lossless transformation.
- Transforms that have an inverse transform to obtain the original data.

In some examples, a lossy transformation and inverse transform that can approximately reconstruct the original data with high precision (near-lossless) may be used.

There are multiple kinds of transforms, and corresponding inverse transforms, that may be utilized by base mesh encoder 212 and base mesh decoder 314 for attribute encoding and decoding.

Base mesh encoder 212 and base mesh decoder 314 may be configured to utilize a Haar Transform, also known as the Haar wavelet transform, is a mathematical technique used in signal processing and image compression. It's a type of wavelet transform that analyzes a signal or an image by dividing it into different scales or resolutions. In image compression, the Haar transform is often used as a simple but effective process to reduce the amount of data needed to represent an image. It achieves compression by removing less important high-frequency details. Haar transform is a wavelet-based technique that decomposes signals or images into different scales, making it useful for tasks like compression and noise reduction in various signal processing applications. It decorrelates data by scale and it partitions signal energy among scale.

This is an example of lossless Integer Haar transform:

Forward transform $$S_n = \left\lfloor \frac{(x_{2n} + x_{2n+1})}{2} \right\rfloor$$

$$M_n = x_{2n+1} - x_{2n}$$

Inverse Transform $$x_{2n+1} = S_n + \left\lfloor \frac{(M_n + 1)}{2} \right\rfloor$$

$$x_{2n} = x_{2n+1} - M_n$$

Base mesh encoder 212 and base mesh decoder 314 may be configured to utilize a prediction-based transform. Prediction-based transform involves using the previously visited/transformed vertices to predict and transform the next vertices. Prediction-based transforms are described in the following documents, which are hereby incorporated by reference:

D. Cohen-Or, R. Cohen and R. Irony., "Multi-way geometry encoding.," The School of Computer Science, Tel-Aviv University, Tel-Aviv, 2002 (hereinafter "Cohen").

M. Isenburg and P. Alliez, "Compressing polygon mesh geometry with parallelogram prediction," IEEE Visualization, no. doi: 10.1109/VISUAL.2002.1183768, pp. 141-146, 2002 (hereinafter "Isenburg").

"Compressing Texture Coordinates with Selective Linear Predictions."

Zhang, S., Zhang, W., Yang, F. and Huo, J., 2019 November. A 3D Haar wavelet transform for point cloud attribute compression based on local surface analysis. In 2019 Picture Coding Symposium (PCS) (pp. 1-5). IEEE.

Chen, Y., Wang, J. and Li, G., 2022 December. A efficient predictive wavelet transform for LiDAR point cloud attribute compression. In 2022 IEEE International Conference on Visual Communications and Image Processing (VCIP) (pp. 1-5). IEEE.

The order in which the vertices are visited for a transform may be flexible too. It may be a scale-based traversal where a transform is first applied to a subset of vertices that form a coarse subsampled mesh. Afterwards the transform is applied to a higher resolution mesh using the previous lower level-of-detail (LoD) representation.

Similarly, any traversal process may be used to traverse the vertices and/or the triangles to apply the transform.

Base mesh encoder 212 and base mesh decoder 314 may be configured to utilize a wavelet transform. A wavelet transform utilizes wavelet functions to represent a signal in terms of localized oscillations and is well-suited for representing both high and low-frequency components efficiently. There are many types of wavelet transform or transforms derived from wavelet transform: Continuous wavelet transform (CWT), Fast wavelet transform (FWT), Complex wavelet transform, Second generation wavelet transform (SGWT), Dual-tree complex wavelet transform (DTCWT), Stationary wavelet transform (SWT), etc.

Base mesh encoder 212 and base mesh decoder 314 may be configured to utilize a Fourier Transform. A Fourier transform represents a signal as a sum of sinusoidal functions. Fourier transforms are effective for analyzing periodic signals and decomposing complex signals into simpler components.

Base mesh encoder 212 and base mesh decoder 314 may be configured to utilize a discrete cosine Transform (DCT) and sine transform. DCT, as described in Pei, S. C. and Yeh, M. H., 2001. The discrete fractional cosine and sine transforms. IEEE Transactions on Signal Processing, 49(6), pp. 1198-1207, incorporated herein by reference, emphasizes energy compaction by representing a signal in terms of its cosine components. It is widely used in image and video compression, such as in JPEG and MPEG formats. DCT is similar to PCA, as described in Wold, S., Esbensen, K. and Geladi, P., 1987. Principal component analysis. Chemometrics and intelligent laboratory systems, 2(1-3), pp. 37-52, incorporated herein by reference, as well as Karhunen-Loeve transform, as described in Jain, A. K., 1976. A fast Karhunen-Loeve transform for a class of random processes. IEEE Transactions on Communications, 24(9), pp. 1023-1029, both of which may also be used in the approach explained above.

Base mesh encoder 212 and base mesh decoder 314 may be configured to utilize a Burrows-Wheeler Transform (BWT). BWT, as described in Manzini, G., 2001. An analysis of the Burrows-Wheeler transform. Journal of the ACM (JACM), 48(3), pp. 407-430, incorporated herein by reference, reorders characters in a block of text based on repeated patterns. It is often used as a preprocessing step in data compression algorithms, like in the Burrows-Wheeler Compression (BWT) algorithm.

Base mesh encoder 212 and base mesh decoder 314 may be configured to utilize a learning-based transform. Learning-based transforms are commonly used in image-compression tasks as well as video-compression tasks. Examples of learning-based transforms used in image-compression include the following, all of which are incorporated herein by reference:

X. Hou et al., "Learning Based Image Transformation Using Convolutional Neural Networks," in IEEE Access, vol. 6, pp. 49779-49792, 2018, doi: 10.1109/ACCESS.2018.2868733.

Ballé, J., Laparra, V., & Simoncelli, E. P. (2016). End-to-end optimized image compression. arXiv preprint arXiv:1611.01704.

Ballé, J., Chou, P. A., Minnen, D., Singh, S., Johnston, N., Agustsson, E., Hwang, S. J. and Toderici, G., 2020, Nonlinear transform coding. IEEE Journal of Selected Topics in Signal Processing, 15(2), pp. 339-353.

Ballé, J., Minnen, D., Singh, S., Hwang, S. J. and Johnston, N., 2018. Variational image compression with a scale hyperprior. arXiv preprint arXiv:1802.01436.

Examples of learning-based transforms used in video-compression include the following, which is incorporated herein by reference:

Lu, G., Ouyang, W., Xu, D., Zhang, X., Cai, C. and Gao, Z., 2019. Dvc: An end-to-end deep video compression framework. In Proceedings of the IEEE/CVF Conference on Computer Vision and Pattern Recognition (pp. 11006-11015).

Learning-based transform commonly involves deep learning-based filters to transform the data into a higher dimensional features. The weights of these filters are typically learned through backpropagation.

The following changes/flexibility may be added to this framework:

- Some examples of this disclosure include implementing transform on all the vertices' attributes. However, some examples may include applying transform to a portion/submesh/segment/block of attributes. This way, the transform may be applied to an aggregation of some attributes instead of all of them.
- Typically, the attributes are coded sample by sample. To apply a transform, a group/block/segment of attribute samples are predicted, residuals computed, and transformed, if applicable, and/or quantized, if applicable. Similarly, to reconstruct the group/block/segment of attribute samples in encoder/decoder, the inverse transformation is applied, if applicable, and/or dequantization, if applicable.
- The current implementation of base mesh encoder encodes one "connected component" at a time for connectivity and attributes encoding and then performs entropy encoding on all "connected components". The transforms may be applied either one connected component at a time and/or may be implemented on the combination of all connected components.
- In the current implementation of V-DMC, the input to the base mesh encoder is either a single or multiple submeshes. The transforms may be applied either one submesh at a time and/or may be implemented on the combination of some or all submeshes. Combination of all submeshes forms the original mesh.

These transforms can also have an optional quantization step in encoder and/or an inverse quantization (dequantization) step in the decoder side. This should further decrease the encoded bitstream size.

Typically, the transform is applied before the quantization step in the encoder. While the dequantization is applied before the inverse transform. The order of quantization, transform, dequantization, inverse-transform can be switched.

The order and location of transform, quantization, dequantization, and inverse-transform is also flexible and can change based on the best performance.

It is also possible to not have a transform at all and just use quantization in the framework.

The quantization and dequantization can both be lossy as well as lossless implementation.

The transform and/or quantization and/or the whole base mesh encoder can both be lossy as well as lossless implementation.

Some examples of this disclosure utilize an integer haar transform. However, any type of transform can be applied.

Some examples of this disclosure utilize applying transform on the residuals of the attributes to be encoded. However, transform can be applied directly to attributes and/or the predictions and/or the residuals.

Multiple transforms can be applied at the same time. Multiple types of transforms can be applied for attribute encoding.

Some examples of this disclosure include applying the transform on Geometry (3D) and UV coordinates (2D). However, it can be applied to any attribute to be compressed. Similarly, the transforms are not limited to 3D or 2D data but can be applied to any number of dimensions.

There is also an option to turn on and off the transform based on the frame, sequence, data type, coding performance, etc.

Signaling and framework functionality will now be described. For the transform itself, there is typically no additional information needed to be sent to the decoder side. However, flexibility may be added to the system by adding additional overhead and a need to transmit additional signaling bits.

The parameters required by the transform on attribute encoding may include:

A signal to tell how much quantization to perform (quantization bit depth). Alternately, a quantization scale value (or a QP value that may be used to determine the scale value) may be signaled to indicate the level of quantization, or to indicate how to perform the inverse quantization.

If the transform is optional, then a signal to let the decoder know that a transform was applied.

If there are multiple types of transforms, then the transform that was applied may need to be signaled.

If there is an option to apply a transform to data other than the residuals, then where the transform was applied may be signaled.

Figure 17:
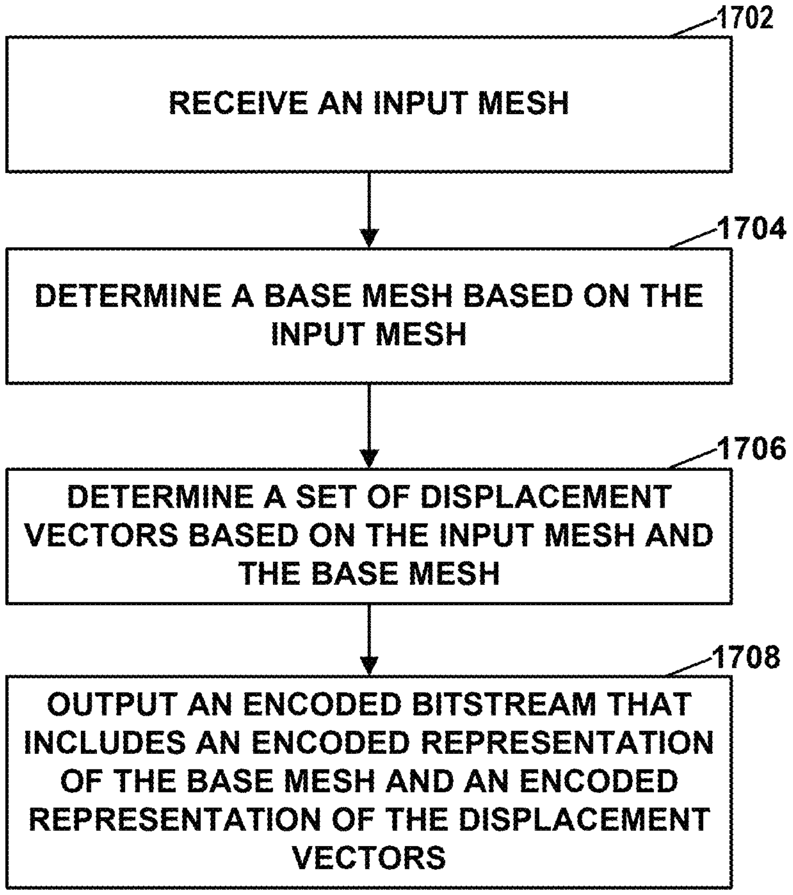
FIG. 17 is a flowchart illustrating an example process for encoding a mesh.

FIG. 17 is a flowchart illustrating an example process for encoding a mesh. Although described with respect to V-DMC encoder 200 (FIGS. 1 and 2), it should be understood that other devices may be configured to perform a process similar to that of FIG. 17.

In the example of FIG. 17, V-DMC encoder 200 receives an input mesh (1702). V-DMC encoder 200 determines a base mesh based on the input mesh (1704). V-DMC encoder 200 determines a set of displacement vectors based on the input mesh and the base mesh (1706). V-DMC encoder 200 outputs an encoded bitstream that includes an encoded representation of the base mesh and an encoded representation of the displacement vectors (1708). V-DMC encoder 200 may additionally determine attribute values from the input mesh and include an encoded representation of the attribute values vectors in the encoded bitstream.

Figure 18:
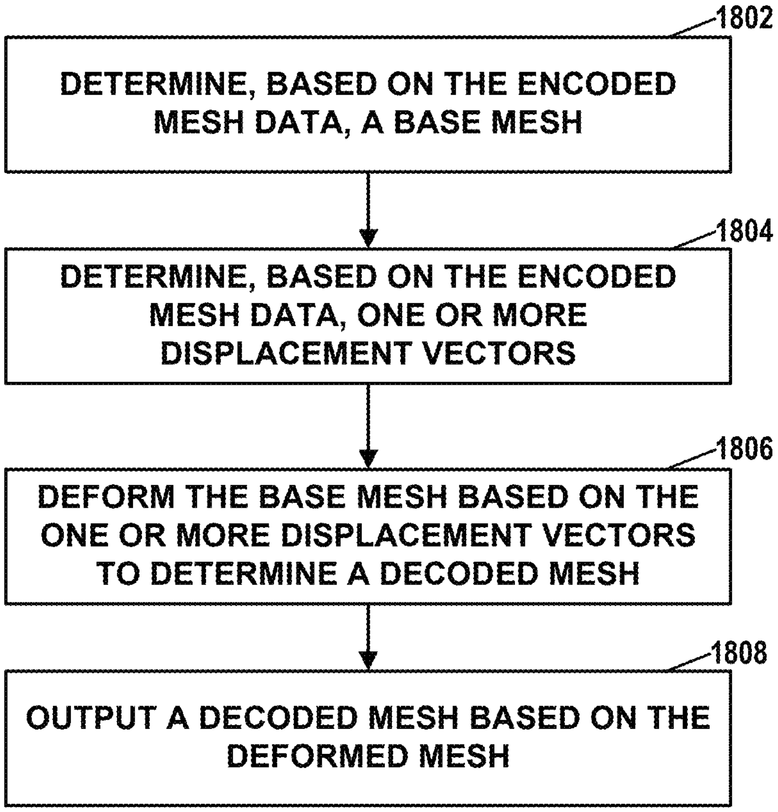
FIG. 18 is a flowchart illustrating an example process for decoding a compressed bitstream of mesh data.

FIG. 18 is a flowchart illustrating an example process for decoding a compressed bitstream of mesh data. Although described with respect to V-DMC decoder 300 (FIGS. 1 and 3), it should be understood that other devices may be configured to perform a process similar to that of FIG. 18.

In the example of FIG. 18, V-DMC decoder 300 determines, based on the encoded mesh data, a base mesh (1802). V-DMC decoder 300 determines, based on the encoded mesh data, one or more displacement vectors (1804). V-DMC decoder 300 deforms the base mesh using the one or more displacement vectors (1806). For example, the base mesh may have a first set of vertices, and V-DMC decoder 300 may subdivide the base mesh to determine an additional set of vertices for the base mesh. To deform the base mesh, V-DMC decoder 300 may modify the locations of the additional set of vertices based on the one or more displacement vectors. V-DMC decoder 300 outputs a decoded mesh based on the deformed mesh (1808). V-DMC decoder 300 may, for example, output the decoded mesh for storage, transmission, or display.

Figure 19:
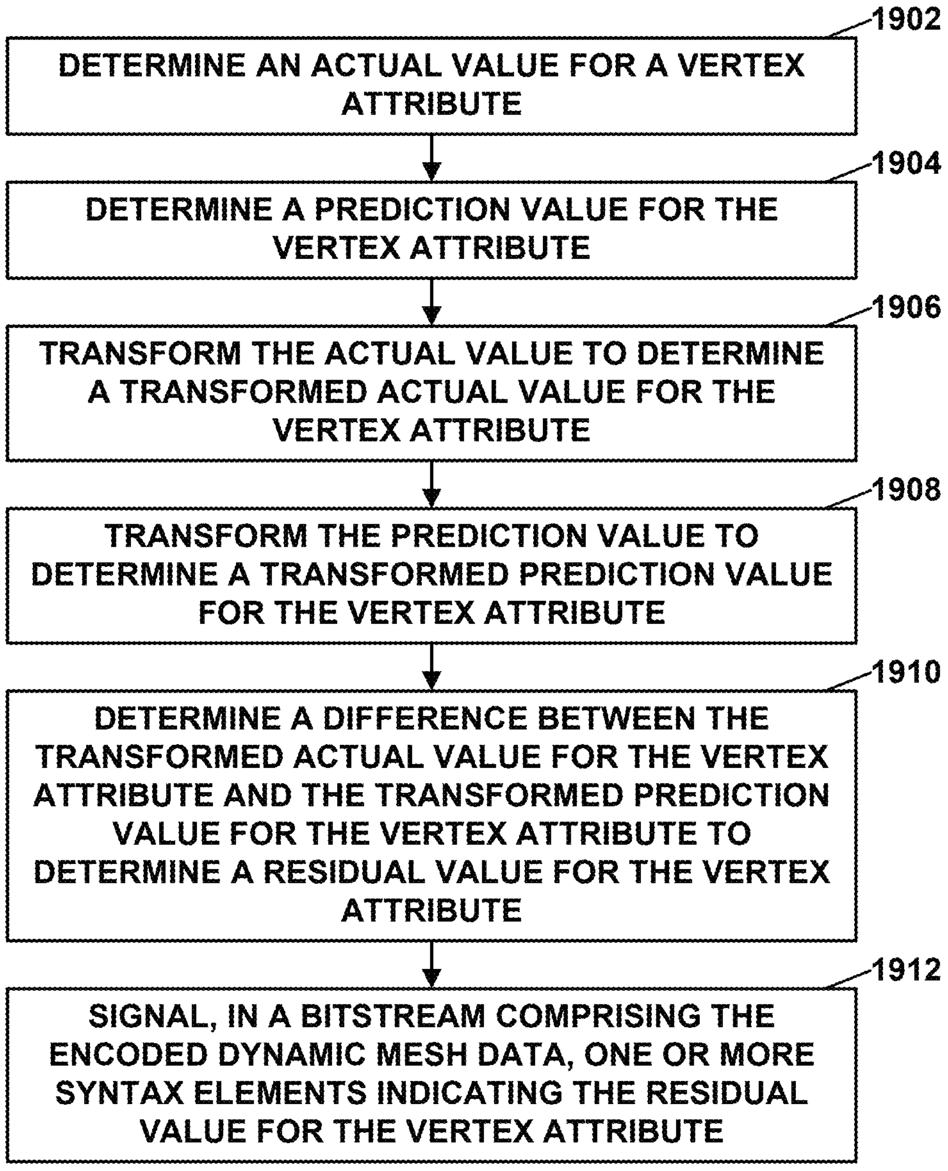
FIG. 19 is a flowchart illustrating an example process for encoding a mesh.

FIG. 19 is a flowchart illustrating an example process for encoding a mesh. Although described with respect to V-DMC encoder 200 (FIGS. 1 and 2), it should be understood that other devices may be configured to perform a process similar to that of FIG. 19.

In the example of FIG. 19, V-DMC encoder 200 determines an actual value for a vertex attribute (1902). The vertex attribute may, for example, be a vertex, a texture map, RGB color values, or a normal. V-DMC encoder 200 determines a prediction value for the vertex attribute (1904). V-DMC encoder 200 transforms the actual value to determine a transformed actual value for the vertex attribute (1906). V-DMC encoder 200 transforms the prediction value to determine a transformed prediction value for the vertex attribute (1908). V-DMC encoder 200 determines a difference between the transformed actual value for the vertex attribute and the transformed prediction value for the vertex attribute to determine a residual value for the vertex attribute (1910). V-DMC encoder 200 signals, in a bitstream comprising the encoded dynamic mesh data, one or more syntax elements indicating the residual value for the vertex attribute (1912).

Figure 20:
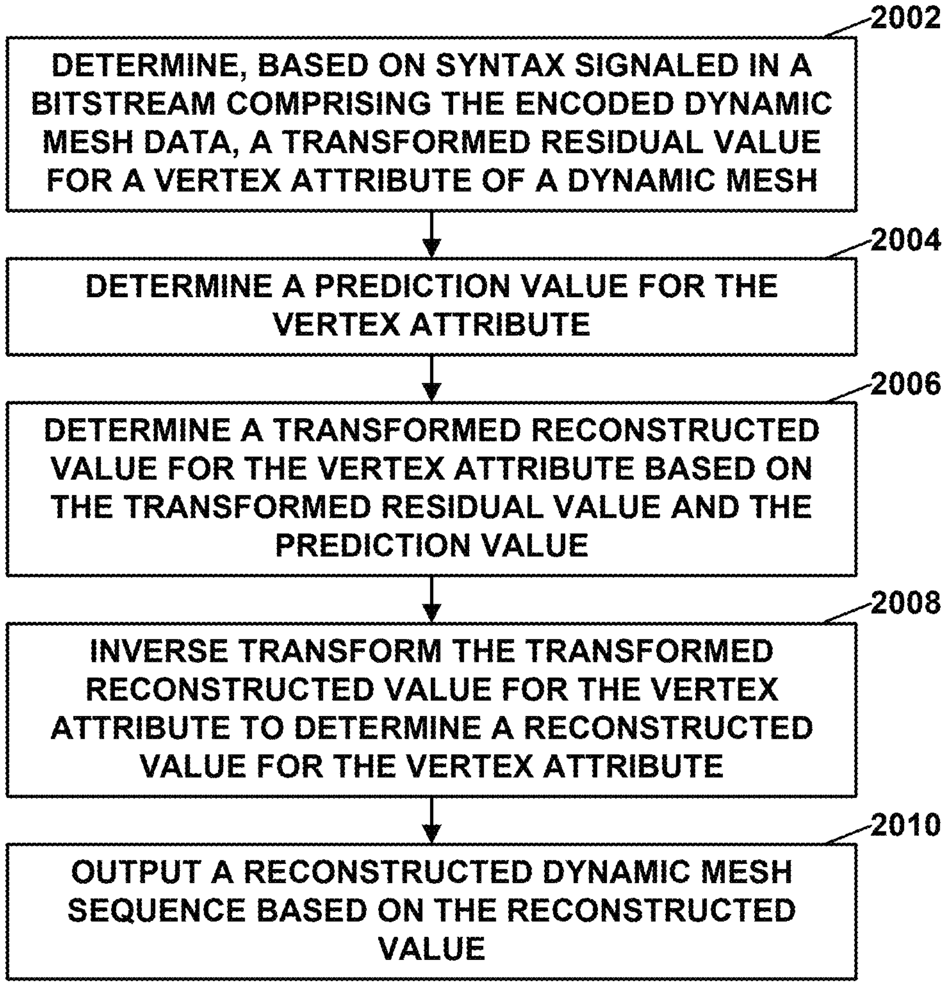
FIG. 20 is a flowchart illustrating an example process for decoding a compressed bitstream of mesh data.

FIG. 20 is a flowchart illustrating an example process for decoding a compressed bitstream of mesh data. Although described with respect to V-DMC decoder 300 (FIGS. 1 and 3), it should be understood that other devices may be configured to perform a process similar to that of FIG. 20.

V-DMC decoder 300 determines, based on syntax signaled in a bitstream comprising the encoded dynamic mesh data, a transformed residual value for a vertex attribute of a dynamic mesh (2002). V-DMC decoder 300 determines a prediction value for the vertex attribute (2004). V-DMC decoder 300 determines a transformed reconstructed value for the vertex attribute based on the transformed residual value and the prediction value (2006). V-DMC decoder 300 inverse transforms the transformed reconstructed value for the vertex attribute to determine a reconstructed value for the vertex attribute (2008).

The prediction value may, for example, be a transform domain prediction value, and the residual value may be a transform domain residual value. V-DMC decoder 300 may determine the reconstructed value for the vertex attribute based on the residual value and the prediction value by adding the transform domain prediction value to the transform domain residual value to determine a transform domain reconstructed value and applying an inverse transform to the transform domain reconstructed value to determine the reconstructed value. V-DMC decoder 300 may apply a transform to the prediction value for the vertex attribute to determine the transform domain prediction value.

In some examples, the prediction value may be a quantized prediction value, and the residual value may be a quantized residual value. V-DMC decoder 300 may determine the reconstructed value for the vertex attribute based on the residual value and the prediction by adding the quantized prediction value to the quantized residual value to determine a quantized reconstructed value and inverse quantizing the quantized reconstructed value to determine the reconstructed value. V-DMC decoder 300 may quantize the prediction value for the vertex attribute to determine the quantized prediction value.

V-DMC decoder 300 outputs a reconstructed dynamic mesh sequence based on the reconstructed value (2010). The vertex attribute may, for example, be a vertex, a texture map, RGB color values, or a normal. V-DMC decoder 300 may, for example, output the reconstructed dynamic mesh for display, transmission, or storage.

The following numbered clauses illustrate one or more aspects of the devices and techniques described in this disclosure.

Clause 1A: A device for decoding encoded dynamic mesh data, the device comprising: one or more memories; and one or more processors, implemented in circuitry and in communication with the one or more memories, configured to: determine, based on syntax signaled in a bitstream comprising the encoded dynamic mesh data, a residual value for a vertex attribute of a dynamic mesh; determine a prediction value for the vertex attribute; determining a reconstructed value for the vertex attribute based on the residual value and the prediction value, wherein one or more of determining the residual value for the vertex attribute, determining the prediction value for the vertex attribute, and determining the reconstructed value for the vertex attribute comprises performing one or both of an inverse transform or a dequantization; and output a reconstructed dynamic mesh sequence that includes the reconstructed vertex value.

Clause 2A: The device of clause 1A, wherein the attribute value comprise geometry for a 3D position of a vertex.

Clause 3A: The device of clause 1A, wherein the attribute value comprises a coordinate for a texture map.

Clause 4A: The device of clause 1A or 2A, wherein: the prediction value comprises a transform domain prediction value; the residual value comprises a transform domain residual value; the one or more processors are further configured to determine the reconstructed value for the vertex attribute based on the residual value and the prediction comprises adding the transform domain prediction value to the transform domain residual value to determine a transform domain reconstructed value and applying an inverse transform to the transform domain reconstructed value to determine the reconstructed value.

Clause 5A: The device of any of clauses 1A-4A, wherein the one or more processors are further configured to: perform an inverse transform on transform domain residual values to determine the residual value.

Clause 6A: The device of any of clauses 1A-5A, wherein: the prediction value comprises a quantized prediction value; the residual value comprises a quantized residual value; to determine the reconstructed value for the vertex attribute based on the residual value and the prediction, the one or more processors are further configured to add the quantized prediction value to the quantized residual value to determine a quantized reconstructed value and inverse quantizing the quantized reconstructed value to determine the reconstructed value.

Clause 7A: The device of any of clauses 1A-6A, wherein the one or more processors are further configured to: dequantize a quantized residual value to determine the residual value.

Clause 8A: The device of any of clauses 1A-7A, wherein the one or more processors are further configured to: inverse transform domain residual values to determine the residual value.

Clause 9A. A method of decoding encoded dynamic mesh data, the method comprising: determining, based on syntax signaled in a bitstream comprising the encoded dynamic mesh data, a residual value for a vertex attribute of a dynamic mesh; determining a prediction value for the vertex attribute; determining a reconstructed value for the vertex attribute based on the residual value and the prediction value, wherein one or more of determining the residual value for the vertex attribute, determining the prediction value for the vertex attribute, and determining the reconstructed value for the vertex attribute comprises performing one or both of an inverse transform or a dequantization; and outputting a reconstructed dynamic mesh sequence that includes the reconstructed vertex value.

Clause 10A: The method of clause 9A, wherein the attribute value comprise geometry for a 3D position of a vertex.

Clause 11A: The method of clause 9A, wherein the attribute value comprises a coordinate for a texture map.

Clause 12A: The method of any of clauses 9A-11A, wherein: the prediction value comprises a transform domain prediction value; the residual value comprises a transform domain residual value; determining the reconstructed value for the vertex attribute based on the residual value and the prediction comprises adding the transform domain prediction value to the transform domain residual value to determine a transform domain reconstructed value and applying an inverse transform to the transform domain reconstructed value to determine the reconstructed value.

Clause 13A: The method of any of clauses 9A-12A, further comprising: performing an inverse transform on transform domain residual values to determine the residual value.

Clause 14A. The method of any of clauses 9A-13A, wherein: the prediction value comprises a quantized prediction value; the residual value comprises a quantized residual value; determining the reconstructed value for the vertex attribute based on the residual value and the prediction comprises adding the quantized prediction value to the quantized residual value to determine a quantized reconstructed value and inverse quantizing the quantized reconstructed value to determine the reconstructed value.

Clause 15A: The method of any of clauses 9A-14A, further comprising: dequantizing a quantized residual value to determine the residual value.

Clause 16A: The method of any of clauses 9A-15A, further comprising: inverse transforming transform domain residual values to determine the residual value.

Clause 17A. A computer-readable storage medium storing instructions that when executed by one or more processors cause the one or more processors to: determine, based on syntax signaled in a bitstream comprising the encoded dynamic mesh data, a residual value for a vertex attribute of a dynamic mesh; determine a prediction value for the vertex attribute; determining a reconstructed value for the vertex attribute based on the residual value and the prediction value, wherein one or more of determining the residual value for the vertex attribute, determining the prediction value for the vertex attribute, and determining the reconstructed value for the vertex attribute comprises performing one or both of an inverse transform or a dequantization; and output a reconstructed dynamic mesh sequence that includes the reconstructed vertex value.

Clause 18A: The computer-readable storage medium of clause 17A, wherein the attribute value comprise geometry for a 3D position of a vertex.

Clause 19A: The computer-readable storage medium of clause 17A, wherein the attribute value comprises a coordinate for a texture map.

Clause 20A: The computer-readable storage medium of clause 17A or 18A, wherein: the prediction value comprises a transform domain prediction value; the residual value comprises a transform domain residual value; the instructions cause the one or more processors to determine the reconstructed value for the vertex attribute based on the residual value and the prediction comprises adding the transform domain prediction value to the transform domain residual value to determine a transform domain reconstructed value and applying an inverse transform to the transform domain reconstructed value to determine the reconstructed value.

Clause 21A: The computer-readable storage medium of any of clauses 17A-20A, wherein the instructions cause the one or more processors to: perform an inverse transform on transform domain residual values to determine the residual value.

Clause 22A. The computer-readable storage medium of any of clauses 17A-21A, wherein: the prediction value comprises a quantized prediction value; the residual value comprises a quantized residual value; to determine the reconstructed value for the vertex attribute based on the residual value and the prediction, the instructions cause the one or more processors are further to add the quantized prediction value to the quantized residual value to determine a quantized reconstructed value and inverse quantizing the quantized reconstructed value to determine the reconstructed value.

Clause 23A: The computer-readable storage medium of any of clauses 17A-22A, wherein the instructions cause the one or more processors to: dequantize a quantized residual value to determine the residual value.

Clause 24A: The computer-readable storage medium of any of clauses 17A-23A, wherein the instructions cause the one or more processors to: inverse transform domain residual values to determine the residual value.

Clause 25A. A device for decoding encoded dynamic mesh data, the device comprising: means for determining, based on syntax signaled in a bitstream comprising the encoded dynamic mesh data, a residual value for a vertex attribute of a dynamic mesh; means for determining a prediction value for the vertex attribute; means for determining a reconstructed value for the vertex attribute based on the residual value and the prediction value, wherein one or more of determining the residual value for the vertex attribute, determining the prediction value for the vertex attribute, and determining the reconstructed value for the vertex attribute comprises performing one or both of an inverse transform or a dequantization; and means for outputting a reconstructed dynamic mesh sequence that includes the reconstructed vertex value.

Clause 26A: The device of clause 25A, wherein the attribute value comprise geometry for a 3D position of a vertex.

Clause 27A: The device of clause 25A or 26A, wherein the attribute value comprises a coordinate for a texture map.

Clause 28A: The device of any of clauses 25A-27A, wherein: the prediction value comprises a transform domain prediction value; the residual value comprises a transform domain residual value; means for determining the reconstructed value for the vertex attribute based on the residual value and the prediction comprises adding the transform domain prediction value to the transform domain residual value to determine a transform domain reconstructed value and applying an inverse transform to the transform domain reconstructed value to determine the reconstructed value.

Clause 29A: The device of any of clauses 25A-28A, further comprising: means for performing an inverse transform on transform domain residual values to determine the residual value.

Clause 30A. The device of any of clauses 25A-29A, wherein: the prediction value comprises a quantized prediction value; the residual value comprises a quantized residual value; means for determining the reconstructed value for the vertex attribute based on the residual value and the prediction comprises adding the quantized prediction value to the quantized residual value to determine a quantized reconstructed value and inverse quantizing the quantized reconstructed value to determine the reconstructed value.

Clause 31A: The device of any of clauses 25A-30A, further comprising: means for dequantizing a quantized residual value to determine the residual value.

Clause 32A: The device of any of clauses 25A-31A, further comprising: means for inverse transforming transform domain residual values to determine the residual value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Clause 1B. A device for decoding encoded dynamic mesh data, the device comprising: one or more memories; and one or more processors, implemented in circuitry and in communication with the one or more memories, configured to: determine, based on syntax signaled in a bitstream comprising the encoded dynamic mesh data, a transformed residual value for a vertex attribute of a dynamic mesh; determine a prediction value for the vertex attribute; determine a transformed reconstructed value for the vertex attribute based on the transformed residual value and the prediction value; inverse transforming the transformed reconstructed value for the vertex attribute to determine a reconstructed value for the vertex attribute; and output a reconstructed dynamic mesh sequence based on the reconstructed value for the vertex attribute.

Clause 2B: The device of clause 1B, wherein: the prediction value comprises a transform domain prediction value; the residual value comprises a transform domain residual value; and to determine the reconstructed value for the vertex attribute based on the residual value and the prediction value, the one or more processors are configured to add the transform domain prediction value to the transform domain residual value to determine a transform domain reconstructed value and apply an inverse transform to the transform domain reconstructed value to determine the reconstructed value.

Clause 3B: The device of clause 2B, wherein the one or more processors are further configured to apply a transform to the prediction value for the vertex attribute to determine the transform domain prediction value.

Clause 4B. The device of any of clauses 1B-3B, wherein: the prediction value comprises a quantized prediction value; the residual value comprises a quantized residual value; and to determine the reconstructed value for the vertex attribute based on the residual value and the prediction, the one or more processors are further configured to add the quantized prediction value to the quantized residual value to determine a quantized reconstructed value and inverse quantize the quantized reconstructed value to determine the reconstructed value.

Clause 5B: The device of clause 4B, wherein the one or more processors are further configured to: quantize the prediction value for the vertex attribute to determine the quantized prediction value.

Clause 6B: The device of any of clauses 1B-5B, wherein the vertex attribute comprise geometry for a 3D position of a vertex.

Clause 7B: The device of any of clauses 1B-5B, wherein the vertex attribute comprises a coordinate for a texture map.

Clause 8B: The device of any of clauses 1B-5B, wherein the vertex attribute comprise RGB color values.

Clause 9B: The device of any of clauses 1B-5B, wherein the vertex attribute comprises a normal.

Clause 10B. A method of decoding encoded dynamic mesh data, the method comprising: determining, based on syntax signaled in a bitstream comprising the encoded dynamic mesh data, a transformed residual value for a vertex attribute of a dynamic mesh; determining a prediction value for the vertex attribute; determining a transformed reconstructed value for the vertex attribute based on the transformed residual value and the prediction value; inverse transforming the transformed reconstructed value for the vertex attribute to determine a reconstructed value for the vertex attribute; and outputting a reconstructed dynamic mesh sequence based on the reconstructed value for the vertex attribute.

Clause 11B: The method of clause 10B, wherein: the prediction value comprises a transform domain prediction value; the residual value comprises a transform domain residual value; and determining the reconstructed value for the vertex attribute based on the residual value and the prediction value comprises adding the transform domain prediction value to the transform domain residual value to determine a transform domain reconstructed value and applying an inverse transform to the transform domain reconstructed value to determine the reconstructed value.

Clause 12B: The method of clause 11B, further comprising: applying a transform to the prediction value for the vertex attribute to determine the transform domain prediction value.

Clause 13B. The method of any of clauses 10B-12B, wherein: the prediction value comprises a quantized prediction value; the residual value comprises a quantized residual value; and determining the reconstructed value for the vertex attribute based on the residual value and the prediction comprises adding the quantized prediction value to the quantized residual value to determine a quantized reconstructed value and inverse quantizing the quantized reconstructed value to determine the reconstructed value.

Clause 14B: The method of clause 13B, further comprising: quantizing the prediction value for the vertex attribute to determine the quantized prediction value.

Clause 15B: The method of any of clauses 10B-14B, wherein the vertex attribute comprise geometry for a 3D position of a vertex.

Clause 16B: The method of any of clauses 10B-14B, wherein the vertex attribute comprises a coordinate for a texture map.

Clause 17B: The method of any of clauses 10B-14B, wherein the vertex attribute comprise RGB color values.

Clause 18B: The method of any of clauses 10B-14B, wherein the vertex attribute comprises a normal.

Clause 19. A device for encoding dynamic mesh data, the device comprising: one or more memories; and one or more processors, implemented in circuitry and in communication with the one or more memories, configured to: determine an actual value for a vertex attribute;

determine a prediction value for the vertex attribute; transform the actual value to determine a transformed actual value for the vertex attribute; transform the prediction value to determine a transformed prediction value for the vertex attribute; determine a difference between the transformed actual value for the vertex attribute and the transformed prediction value for the vertex attribute to determine a residual value for the vertex attribute; and signal, in a bitstream comprising the encoded dynamic mesh data, one or more syntax elements indicating the residual value for the vertex attribute.

Clause 20B: The device of clause 19B, wherein the one or more processors are further configured to: quantize the transformed actual value for the vertex attribute to determine a quantized transformed actual value; quantize the transformed prediction value for the vertex attribute to determine a quantized transformed prediction value; and wherein to determine the difference between the transformed actual value for the vertex attribute and the transformed prediction value for the vertex attribute, the one more processors are configured to determine a difference between the quantized transformed actual value and the quantized transformed prediction value.

Clause 21B: The device of clause 19B or 20B, wherein the vertex attribute comprise geometry for a 3D position of a vertex.

Clause 22B: The device of clause 19B or 20B, wherein the vertex attribute comprises a coordinate for a texture map.

Clause 23B: The device of clause 19B or 20B, wherein the vertex attribute comprise RGB color values.

Clause 24B: The device of clause 19B or 20B, wherein the vertex attribute comprises a normal.

Clause 25Bb. A method of encoding dynamic mesh data, the method comprising: determining an actual value for a vertex attribute;

determining a prediction value for the vertex attribute; transforming the actual value to determine a transformed actual value for the vertex attribute; transforming the prediction value to determine a transformed prediction value for the vertex attribute; determining a difference between the transformed actual value for the vertex attribute and the transformed prediction value for the vertex attribute to determine a residual value for the vertex attribute; and signaling, in a bitstream comprising the encoded dynamic mesh data, one or more syntax elements indicating the residual value for the vertex attribute.

Clause 26B: The method of clause 25B, further comprising: quantizing the transformed actual value for the vertex attribute to determine a quantized transformed actual value; quantizing the transformed prediction value for the vertex attribute to determine a quantized transformed prediction value; and wherein determining the difference between the transformed actual value for the vertex attribute and the transformed prediction value for the vertex attribute comprises determining a difference between the quantized transformed actual value and the quantized transformed prediction value.

Clause 27B: The method of clause 25B or 26B, wherein the vertex attribute comprise geometry for a 3D position of a vertex.

Clause 28B: The method of clause 25B or 26B, wherein the vertex attribute comprises a coordinate for a texture map.

Clause 29B: The method of clause 25B or 26B, wherein the vertex attribute comprise RGB color values.

Clause 30B: The method of clause 25B or 26B, wherein the vertex attribute comprises a normal.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded dynamic mesh data, the device comprising:

one or more memories; and one or more processors, implemented in circuitry and in communication with the one or more memories, configured to:

determine, based on syntax signaled in a bitstream comprising the encoded dynamic mesh data, a residual value for a vertex attribute of a dynamic mesh, wherein the residual value comprises a transform domain residual value;

determine a prediction value for the vertex attribute, wherein the prediction value comprises a transform domain prediction value;

determine a reconstructed value for the vertex attribute based on the residual value and the prediction value, wherein to determine the reconstructed value for the vertex attribute based on the residual value and the prediction value, the one or more processors are configured to:

add the transform domain prediction value to the transform domain residual value to determine a transform domain reconstructed value; and apply an inverse transform to the transform domain reconstructed value to determine the reconstructed value; and output a reconstructed dynamic mesh sequence based on the reconstructed value for the vertex attribute.

2. The device of claim 1, wherein the one or more processors are further configured to apply a transform to the prediction value for the vertex attribute to determine the transform domain prediction value.

3. The device of claim 1, wherein:

the prediction value comprises a quantized prediction value;

the residual value comprises a quantized residual value; and to determine the reconstructed value for the vertex attribute based on the residual value and the prediction, the one or more processors are further configured to add the quantized prediction value to the quantized residual value to determine a quantized reconstructed value and inverse quantize the quantized reconstructed value to determine the reconstructed value.

4. The device of claim 3, wherein the one or more processors are further configured to:

quantize the prediction value for the vertex attribute to determine the quantized prediction value.

5. The device of claim 1, wherein the vertex attribute comprise geometry for a 3D position of a vertex.

6. The device of claim 1, wherein the vertex attribute comprises a coordinate for a texture map.

7. The device of claim 1, wherein the vertex attribute comprise RGB color values.

8. The device of claim 1, wherein the vertex attribute comprises a normal.

9. A method of decoding encoded dynamic mesh data, the method comprising:

determining, based on syntax signaled in a bitstream comprising the encoded dynamic mesh data, a residual value for a vertex attribute of a dynamic mesh, wherein the residual value comprises a transform domain residual value;

determining a prediction value for the vertex attribute, wherein the prediction value comprises a transform domain prediction value;

determining a transformed reconstructed value for the vertex attribute based on the transformed residual value and the prediction value, wherein determining the reconstructed value for the vertex attribute based on the residual value and the prediction value comprises:

adding the transform domain prediction value to the transform domain residual value to determine a transform domain reconstructed value; and applying an inverse transform to the transform domain reconstructed value to determine the reconstructed value; and outputting a reconstructed dynamic mesh sequence based on the reconstructed value for the vertex attribute.

10. The method of claim 9, further comprising:

applying a transform to the prediction value for the vertex attribute to determine the transform domain prediction value.

11. The method of claim 9, wherein:

the prediction value comprises a quantized prediction value;

the residual value comprises a quantized residual value; and determining the reconstructed value for the vertex attribute based on the residual value and the prediction comprises adding the quantized prediction value to the quantized residual value to determine a quantized reconstructed value and inverse quantizing the quantized reconstructed value to determine the reconstructed value.

12. The method of claim 11, further comprising:

quantizing the prediction value for the vertex attribute to determine the quantized prediction value.

13. The method of claim 9, wherein the vertex attribute comprise geometry for a 3D position of a vertex.

14. The method of claim 9, wherein the vertex attribute comprises a coordinate for a texture map.

15. The method of claim 9, wherein the vertex attribute comprise RGB color values.

16. The method of claim 9, wherein the vertex attribute comprises a normal.

17. A device for encoding dynamic mesh data, the device comprising:

one or more memories; and one or more processors, implemented in circuitry and in communication with the one or more memories, configured to:

determine an actual value for a vertex attribute;

determine a prediction value for the vertex attribute;

apply a transform to the actual value to determine a transform domain actual value for the vertex attribute;

apply a transform to the prediction value to determine a transform domain prediction value for the vertex attribute;

determine a difference between the transform domain actual value for the vertex attribute and the transform domain prediction value for the vertex attribute to determine a transform domain residual value for the vertex attribute; and signal, in a bitstream comprising the encoded dynamic mesh data, one or more syntax elements indicating the transform domain residual value for the vertex attribute.

18. The device of claim 17, wherein the one or more processors are further configured to:

quantize the transformed actual value for the vertex attribute to determine a quantized transformed actual value;

quantize the transformed prediction value for the vertex attribute to determine a quantized transformed prediction value; and wherein to determine the difference between the transformed actual value for the vertex attribute and the transformed prediction value for the vertex attribute, the one more processors are configured to determine a difference between the quantized transformed actual value and the quantized transformed prediction value.

19. The device of claim 17, wherein the vertex attribute comprise geometry for a 3D position of a vertex.

20. The device of claim 17, wherein the vertex attribute comprises a coordinate for a texture map.

21. The device of claim 17, wherein the vertex attribute comprise RGB color values.

22. The device of claim 17, wherein the vertex attribute comprises a normal.

23. A computer-readable storage medium storing instructions that when executed by one or more processors cause the one or more processors to:

determine, based on syntax signaled in a bitstream comprising encoded dynamic mesh data, a residual value for a vertex attribute of a dynamic mesh, wherein the residual value comprises a transform domain residual value;

determine a prediction value for the vertex attribute, wherein the prediction value comprises a transform domain prediction value;

determine a reconstructed value for the vertex attribute based on the residual value and the prediction value, wherein to determine the reconstructed value for the vertex attribute based on the residual value and the prediction value, the one or more processors are configured to:

add the transform domain prediction value to the transform domain residual value to determine a transform domain reconstructed value; and apply an inverse transform to the transform domain reconstructed value to determine the reconstructed value; and output a reconstructed dynamic mesh sequence based on the reconstructed value for the vertex attribute.

24. The computer-readable storage medium of claim 23, wherein the one or more processors are further configured to apply a transform to the prediction value for the vertex attribute to determine the transform domain prediction value.

25. The computer-readable storage medium of claim 23, wherein:

the prediction value comprises a quantized prediction value;

the residual value comprises a quantized residual value; and to determine the reconstructed value for the vertex attribute based on the residual value and the prediction, the one or more processors are further configured to add the quantized prediction value to the quantized residual value to determine a quantized reconstructed value and inverse quantize the quantized reconstructed value to determine the reconstructed value.

26. The computer-readable storage medium of claim 25, wherein the one or more processors are further configured to:

quantize the prediction value for the vertex attribute to determine the quantized prediction value.

27. The computer-readable storage medium of claim 23, wherein the vertex attribute comprise one of geometry for a 3D position of a vertex, a coordinate for a texture map, RGB color values, or a normal.

* * * * *